(12) United States Patent
Richardson et al.

(10) Patent No.: US 8,174,712 B2
(45) Date of Patent: May 8, 2012

(54) GENERATING PASSIVE METADATA FROM USER INTERFACE SELECTIONS AT AN IMAGING DEVICE

(75) Inventors: Tanna Marie Richardson, Happy Valley, OR (US); Shinsaku Tohki, Yamatokoriyama (JP); Masaya Ishihara, Yamatokoriyama (JP); Tetsuya Shibata, Yamatokoriyama (JP)

(73) Assignee: Sharp Laboratories of America, Inc., Camas, WA (US)

( * ) Notice: Subject to any disclaimer, the term of this patent is extended or adjusted under 35 U.S.C. 154(b) by 1555 days.

(21) Appl. No.: 10/923,417

(22) Filed: Aug. 20, 2004

(65) Prior Publication Data
US 2005/0086240 A1   Apr. 21, 2005

Related U.S. Application Data

(60) Provisional application No. 60/513,236, filed on Oct. 21, 2003.

(51) Int. Cl.
*G06F 3/12* (2006.01)
*G06F 3/00* (2006.01)

(52) U.S. Cl. .......................... 358/1.15; 358/1.13; 710/15

(58) Field of Classification Search .......................... None
See application file for complete search history.

(56) References Cited

U.S. PATENT DOCUMENTS

| | | | |
|---|---|---|---|
| 7,408,660 B1 * | 8/2008 | Barbeau ....................... | 358/1.15 |
| 2001/0038462 A1 * | 11/2001 | Teeuwen et al. .............. | 358/1.15 |
| 2003/0002068 A1 * | 1/2003 | Constantin et al. .......... | 358/1.15 |
| 2003/0081234 A1 * | 5/2003 | Wiley .......................... | 358/1.13 |
| 2003/0117664 A1 * | 6/2003 | McCarthy, Jr. ............... | 358/402 |
| 2003/0140185 A1 * | 7/2003 | Cherry et al. .................. | 710/15 |
| 2003/0226151 A1 * | 12/2003 | Hamada et al. ............... | 725/132 |
| 2004/0010540 A1 * | 1/2004 | Puri et al. ...................... | 709/203 |
| 2004/0126167 A1 * | 7/2004 | Roosen et al. .................. | 400/76 |
| 2005/0018229 A1 * | 1/2005 | Gusler et al. ................. | 358/1.13 |

FOREIGN PATENT DOCUMENTS

JP   2000-113168   4/2000

(Continued)

OTHER PUBLICATIONS

Captaris, Inc., "Captaris RightFax 8.5 Document Management Connector Guide," 2002, 25 pages.

(Continued)

*Primary Examiner* — Vincent Rudolph
(74) *Attorney, Agent, or Firm* — Law Office of Karen Dana Oster, LLC

(57) ABSTRACT

A system and method for generating passive metadata from user interface selections at an imaging device includes an imaging device and at least one destination having at least one controllable setting. The imaging device preferably includes a document imaging system for capturing an image file, a user interface system for accepting passive data user input pertaining to the image file, a data conversion system for converting the passive data into a metadata file, and a transmission system for transmitting the image file and an associated metadata file through a network to at least one destination. The passive data affects at least one controllable setting of the destination. Passive data may be, for example, routing information, user information, file formatting instructions, and/or billing information. The present invention may also include a method for delivering documents that includes the steps of capturing an image file, accepting user input as passive data using a user interface system, converting the passive data into a metadata file, transmitting the image file and an associated metadata file through a data transmission network to a destination, and affecting at least one controllable setting of the destination according to the passive data in the metadata file.

20 Claims, 25 Drawing Sheets

FOREIGN PATENT DOCUMENTS

| | | |
|---|---|---|
| JP | 2001-169121 | 6/2001 |
| JP | 2002-190881 | 7/2002 |
| JP | 2002236570 | 8/2002 |
| JP | 2003-173248 | 6/2003 |
| JP | 2003-216390 | 7/2003 |

OTHER PUBLICATIONS

Captaris, Inc., "Automating Business Communications—Improving the exchange of information between your enterprise and its customers, suppliers, and business partners." 2002, 12 pages.

Xerox Corporation, "Xerox Expands Multifunction Line for Offices With Three New Systems, New Functionality," Jun. 26, 2001, 2 pages, www.xerox.com.

Lynuxworks, Inc., "Xerox Document Centre—Managing multiple documents through parallel job processing," at least as early as Aug. 18, 2004, 2 pages, www.lynuxworks.com.

Sharp Electronics Corporation, "AR-M 350/450 N—The Link to your Network: Network Print-Ready Digital Multi-Tasking System," at least as early as Aug. 20, 2004, 2 pages.

Castelle., "Castelle Network Fax Services," 2004, 2 pages, www.castelle.com.

* cited by examiner

FIG. 3: Sample Control File 122

```xml
<?xml version = "1.0"?>
<NewDocument>
<BillingCode>83649</BillingCode>
<UserID>6581</UserID>
<CoverSheet>Sample1.doc</CoverSheet>
<FaxNumbers>
<FaxNumber>3605551234</FaxNumber>
<FaxNumber>3605551212</FaxNumber>
<DocFormat>Black&White</DocFormat>
</FaxNumbers>
```

User Data: BillingCode, UserID, CoverSheet

Passive Data: FaxNumbers block

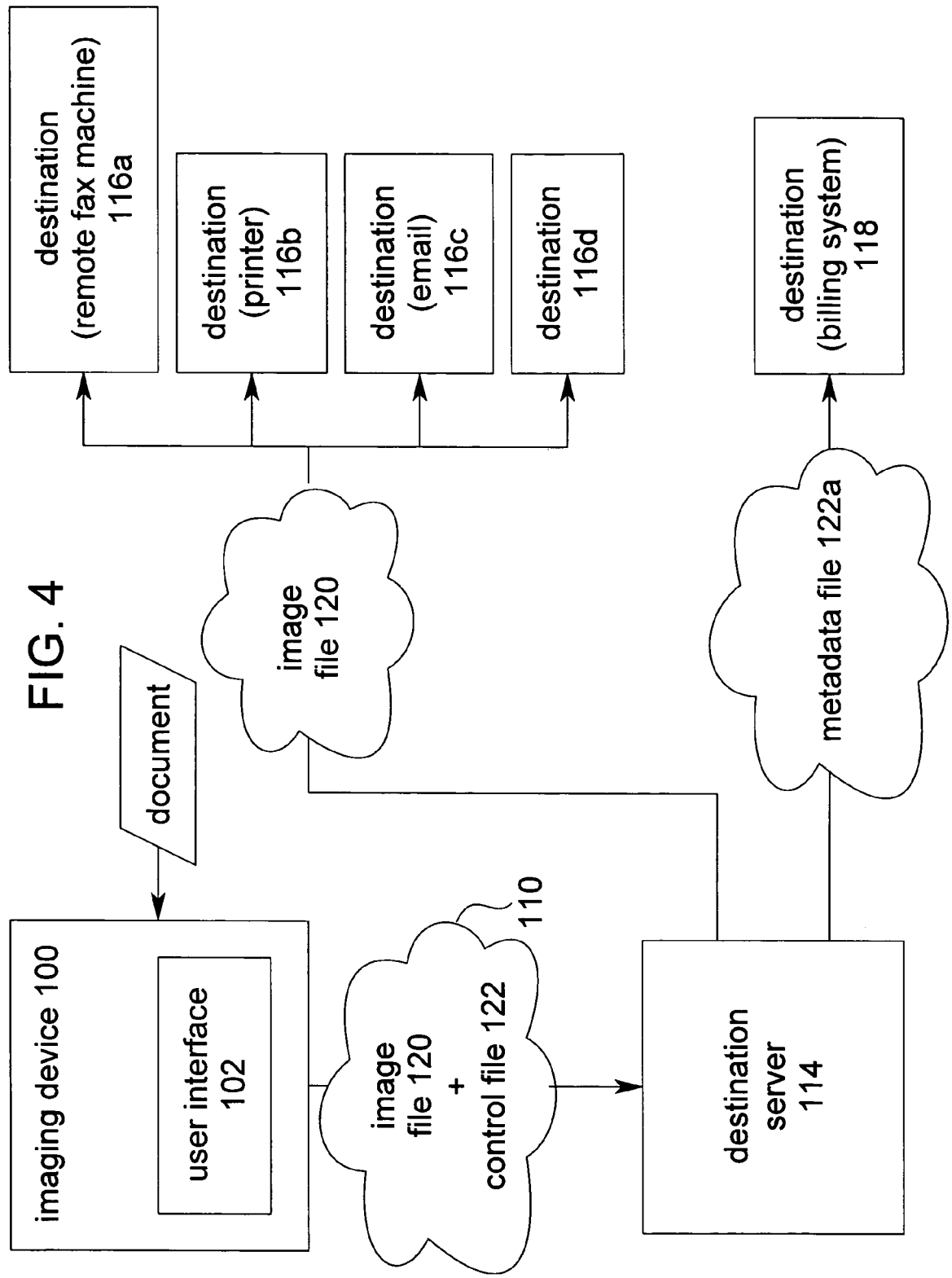

FIG. 5: WEB PAGE SETUP TO ENABLE PASSIVE SWITCH AND DEFINE FAX SERVER SETTINGS

FIG. 6: WEB PAGE SETUP FOR USER DATA

| Prompt to User | XML Tag | Entry Type |
|---|---|---|
| Billing Code | BillCode1 | ⦿ Keyboard Entry<br>○ Selection List: |
| UserID | UserID | ⦿ Keyboard Entry<br>○ Selection List: |
| Cover Sheet | CFSFilename | ○ Keyboard Entry<br>⦿ Selection List: Sample1.doc, Sample2 |
| | | Keyboard Entry |
| | | Keyboard Entry |
| | | Keyboard Entry |
| | | Keyboard Entry |
| | | Keyboard Entry |

Metadata Fields

Submit

FIG. 8: ENTER FAX NUMBER ON KEYPAD

FIG. 9: SEARCH REQUEST ENTRY SCREEN

FIG. 10: GLOBAL SEARCH RESULTS

FIG. 11: MANUAL ENTRY SCREEN

FIG. 12: SELECT NEXT ADDRESS BUTTON

FIG. 13: LOCAL ADDRESS BOOK
SELECT ONE-TOUCH KEY

FIG. 14: SELECT CONDITION SETTINGS BUTTON

FIG. 15: SELECT FAX SERVER BUTTON
(PASSIVE MODE)

FIG. 16: USER DATA SCREENS DISPLAYED, SELECT BILLING CODE

FIG. 17: ENTER BILLING CODE AND PRESS OK

FIG. 18: SELECT USER ID

FIG. 19: ENTER USER ID AND PRESS OK

FIG. 20: SELECT COVER SHEET

FIG. 21: SELECT COVER SHEET AND PRESS OK

FIG. 22: CONFIRM ENTRIES AND PRESS OK

FIG. 23: RETURN TO CONDITION SETTINGS
FAX SERVER HIGHLIGHTED
PRESS START TO SEND

GENERATING PASSIVE METADATA FROM USER INTERFACE SELECTIONS AT AN IMAGING DEVICE

The present application is an application claiming the benefit under 35 USC Section 119(e) of U.S. Provisional Patent Application Ser. No. 60/513,236, filed Oct. 21, 2003. The present application is based on and claims priority from this application, the disclosure of which is hereby expressly incorporated herein by reference in its entirety.

BACKGROUND OF INVENTION

The present invention is directed to generating passive metadata from user interface (UI) selections at an imaging device.

Imaging devices are typically thought of as being capable of imaging a paper document to capture an electronic image file (e.g. an electronic document or a scanned image file) and then transmitting the image file to a destination (e.g. another imaging device, a facsimile machine, a printer, a copier, a computer, document management software, workflow software, security software, a facsimile server (fax server), email server, or any type of server). An imaging device, however, may be, for example, an MFP (Multi-Function Peripheral/Printer/Product), a facsimile machine, a scanner, or any imaging device known or yet to be discovered capable of capturing (as opposed to creating, such as would be done by a computer) an image file and transmitting it to a destination.

Metadata is typically thought of as information (data) about data. Metadata can be collected at the front panel or other user interface (UI) of an imaging device and transmitted along with the scanned image file to a destination. For example, metadata may be extra data that describes the contents of an image file to be used for archiving and retrieval. This metadata may be entered by a user at an MFP front panel and then transmitted along with the scanned image file to a destination. The destination then parses through the metadata file and stores the metadata values along with the image file. Later the user may search for metadata keywords to retrieve the image. In another example, metadata may be extra data appended to a print job that describes the print job characteristics. This metadata may be formatted into a metadata file and sent with the print job to the destination device. The destination device then parses through the metadata file to understand how the image file should be processed.

Metadata may be gathered from user input at the imaging device user interface. One type of user interface is a front panel that includes a screen that may be configurable by an administrator. The administrator may configure custom metadata prompts that appear on simple screens (e.g. a keyboard or a short list of values from which a user may select "user data"). For example, an administrator may create a user data field that prompts the user to input a facsimile number for each intended recipient. The user would be required to enter all the facsimile numbers on a cumbersome keyboard. A limitation of the prior art is that the administrator would have to anticipate and create a data field for each intended destination. Except in the most unusual circumstances, the quantity of pre-created data fields would not match the needs of most users. If, for example, there are five (5) prompts for facsimile numbers, users who want to scan to a single facsimile destination will have to scroll down through four (4) extra user interface prompts. Users who want to scan to twenty (20) facsimile destinations would have to send the facsimile as four (4) separate scan jobs with five (5) facsimile numbers for each scan job. With prior art, the basic process of sending a facsimile to multiple destinations is as follows:

1. From an imaging device, the user selects a facsimile server destination button that triggers user data prompts.
2. The user enters user data as prompted (facsimile number, user ID, billing code, subject, or sender name) from a keyboard user interface.
3. The user places a document in imaging device and presses start.
4. The imaging device captures an image file from the document and a metadata file from the user data and associates the two files.
5. The imaging device transmits the associated image file and user metadata file to a server.
6. The server parses the user metadata file and transmits the image file as specified by the user.

"User data" is metadata such as routing information (e.g. facsimile number, email address, or server address), user information (e.g. user ID, sender name), billing information (e.g. a billing code) and/or any basic collectible information. As an example of metadata being gathered from user input at the imaging device user interface, metadata prompts on the user interface may direct a user to select a specific destination (routing information) for his document and/or to enter other user data. This approach is very flexible because users can be prompted for any information needed by an application. However, this flexibility also limits the functionality that can be attained with this method. Metadata screens are inherently "dumb" for three reasons. First, there are a limited number of metadata fields that an administrator can configure. Second, the user will always be prompted for all metadata fields regardless of what he enters for a previous field. Third, data entry is limited to a keyboard and in some cases a short list of pre-defined values.

"Active data" is distinct from user data. Active data reflects the selections that users make at an imaging device that change the device scanning settings—the way the imaging device either captures or sends the image file. Examples include routing information (e.g. facsimile number, email addresses, or server address) and file formatting instructions/settings (e.g. data format, compression ratio, color options, exposure, resolution, encryption, security settings, or permissions). Because active data is intended for a specific purpose, a very specialized user interface is provided for the user to make selections. For example, when setting routing information, users have the ability to enter addresses, select from one-touch address keys, and/or perform real-time searches of the global address book on a server.

U.S. patent application Ser. No. 20030081234 to Wiley (the "Wiley reference") is directed to a document delivery method and multifunction device therefor. Wiley discloses a device capable of identifying different types of network destinations (e.g. email, facsimile, or printer) to receive a document, formatting the document for each of the different types of network destinations, and sending the formatted document from the multifunction device to each of the different types of network destinations. The formatted document may be an electronic document that combines the image of the paper document with a header (which may include at least delivery or routing information). In one embodiment of the Wiley device, a document property function is provided so that the user may configure at least one document property (e.g. color, black/white, draft, compression ratio, password protection, file type) for the formatted document (the document in electronic format). In other words, prior to being sent to the destination device, the document is formatted with any selected document property. Wiley further discloses interfaces by which the user can specify the type of destination, but the selection is limited to "active data" in that it directly changes the settings of the imaging device. Finally, Wiley discloses that the document is imaged only once for delivery to each of the different types of network destinations.

A facsimile server may be, for example, a computer-based facsimile machine that is generally a "shared use" device installed on a network (e.g. a LAN) or a program (e.g. a software application program) that is associated with hardware suitable to implement similar functions. Network users can access the facsimile server from their PCs in much the same way they share a network-based (shared) printer. Facsimiles can be generated at a user's workstation and "printed" to the facsimile server for transmission. Likewise, a facsimile server can route incoming facsimiles. Facsimile servers eliminate the necessity of printing a document, carrying the document to a facsimile machine, and waiting for the document to be transmitted. Many large companies use facsimile servers in place of facsimile machines to manage their incoming and outgoing facsimiles. Facsimile servers allow a company to monitor the facsimiles that are flowing in and out of the company. Facsimile servers also allow a company to track costs that can be billed to the appropriate department or client. Facsimile servers offer the benefit of advanced facsimile features like secure password-protected documents and automatic cover sheet creation (e.g. based on user ID). Exemplary facsimile servers include Captaris, Inc.'s RIGHTFAX®, Biscom, Incorporated's FAXCOM®, and Castelle Corporation's FAXPRESS®.

Facsimile servers do not have the capability to scan paper documents such that the resulting scanned document may be transmitted to facsimile destinations via the facsimile server. Traditionally, for a paper document to be transmitted using a facsimile server, the paper document must first be scanned, then the resulting scanned document is sent to the facsimile server where information (e.g. a user ID, a billing code, and a destination number) is collected as user data, and the document is then transmitted to facsimile destinations via the facsimile server. This is a slow and cumbersome process.

BRIEF SUMMARY OF THE INVENTION

The present invention is directed to generating passive metadata from user interface (UI) selections at an imaging device.

A system of the present invention includes an imaging device and at least one destination having at least one controllable setting. The imaging device preferably includes a document imaging system for capturing an image file, a user interface system for accepting passive data user input pertaining to the image file, a data conversion system for converting the passive data into a metadata file, and a transmission system for transmitting the image file and an associated metadata file through a network to at least one destination. The passive data affects at least one controllable setting of the destination. Passive data may be, for example, routing information, user information, file formatting instructions, and/or billing information.

The present invention may also include a method for delivering documents that includes the steps of capturing an image file using a document imaging system, accepting user input as passive data using a user interface system, converting the passive data into a metadata file, transmitting the image file and an associated metadata file through a data transmission network to a destination having at least one controllable setting, and affecting at least one controllable setting of the destination according to the passive data in the metadata file.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 3 is an exemplary control file including billing metadata, user input metadata, and passive data metadata.

FIG. 4 is an exemplary high-level schematic diagram for implementing the system and method of the present invention, including an imaging device connected to a destination server through the network.

FIG. 5 is an exemplary screen or web page for enabling a passive switch and defining settings of a server destination.

FIG. 6 is an exemplary screen or web page that may be used to set up user data prompts.

DETAILED DESCRIPTION OF THE INVENTION

Figure 1:
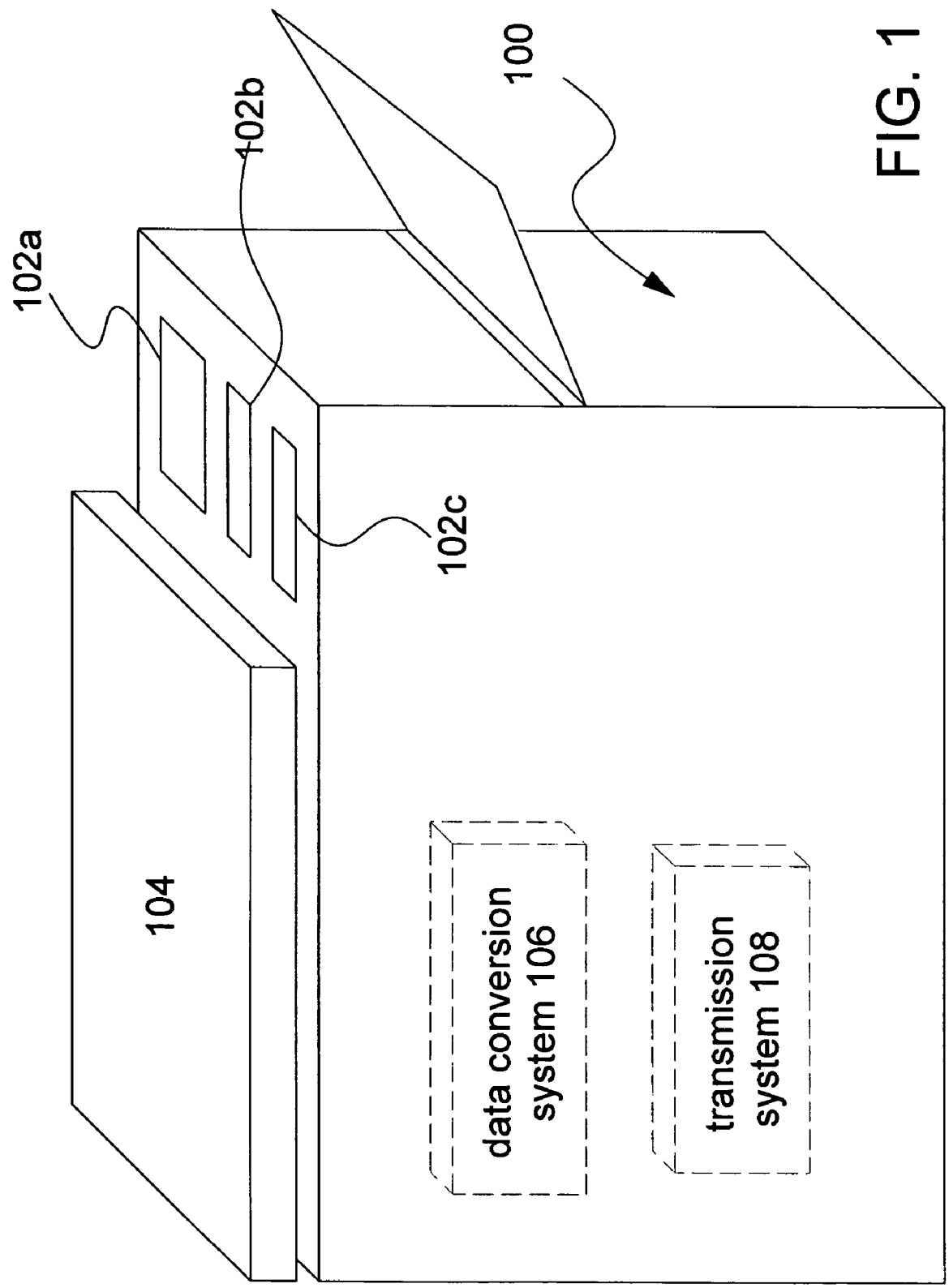
FIG. 1 is a perspective view of a simplified exemplary imaging device of the present invention.

The present invention is directed to generating passive metadata from user interface selections at an advanced functionality user interface of an imaging device. This invention allows advanced functionality user interface screens that are typically used to change device settings to be used to generate passive metadata. The passive metadata does not change the imaging device settings, but is associated (e.g. attached, inserted, or appended) to an image file as passive metadata that is transmitted to a destination. The passive metadata is suitable for affecting at least one controllable setting (e.g. routing information and file formatting instructions) of the destination when the destination receives the metadata file.

It should be noted that metadata may be formatted into any form suitable for transmission and implementation. For example, the metadata may be formatted as text or XML or a file header (e.g. a TIFF tag). It should be noted that although the term "file" is used throughout this document, alternative embodiments may use alternative data formats. For example, a "packet" could be used in place of a file. It is also possible that a plurality of files or a portion of a single file could be used. These data formats are meant to be exemplary and not to limit the scope of the invention.

To understand the present invention, it is crucial to understand the difference between user data, active data, and passive data. These data types are summarized in the following table:

|  | User Data | Active Data | Passive Data |
|---|---|---|---|
| Setup | Administrator defines prompts | None | None or Optional |
| User Interface | Keyboard with custom prompt Short list of values | Specialized screens e.g. LDAP search, one-touch keys | Optional activation switch/button Specialized screens e.g. LDAP search, one-touch keys |
| Types of Data | Routing information (e.g. facsimile number, email address, cover sheet) User information (e.g. user ID, sender name) Billing information | Routing information (e.g. facsimile number, email address, cover sheet) User information (e.g. user ID, sender name) Billing information File formatting instructions | Routing information (e.g. facsimile number, email address, cover sheet) User information (e.g. user ID, sender name) Billing information File formatting instructions |
| Imaging Device Action | Add to metadata file that is forwarded to a destination device | Change imaging device setting | Add to metadata file that is forwarded to a destination device Affect destination device setting |

"User data" is input on limited user data entry screens and includes metadata such as routing information, user information, billing information, and/or any basic collectible information. "Active data" is input on advanced functionality user interface screens and includes data regarding the settings of the imaging device that directly affect the device output—the way the imaging device either captures or sends the image file. Examples include routing information and file formatting instructions. It should be noted that there is some overlap between the types of data input as user data or active data. For example, a facsimile number could be input by the user as user data or selected by the user as active data. "Passive data" has characteristics of both user data and active data. Like active data, the preferred embodiment of passive data is input on advanced functionality user interface screens. Like user data, passive data does not change the imaging device settings, but is associated (e.g. attached, inserted, or appended) to an image file and transmitted to a destination. The passive metadata is suitable for affecting at least one controllable setting of the destination when the destination receives the metadata file. A novel feature of the present invention is that passively entered metadata affects at least one controllable setting of the destination when the destination receives the metadata file. Another novel feature of the present invention is that some types of passive data can affect controllable file formatting instructions (e.g. data format, compression ratio, color options, exposure, resolution, encryption, security settings, or permissions).

One advantage of the present invention is that it provides the functionality of user data with the advanced means for inputting active data. This is a significant improvement over known MFP devices that only provide primitive input mechanisms for the input of user data. This is also a significant improvement over known MFP devices that employ the document delivery method set forth in the Wiley reference. As set forth above, the Wiley reference discloses interfaces by which the user can specify the type of destination, but the selection is limited to "active data" in that it directly changes the settings of the Wiley multifunction device. The Wiley multifunction device identifies different types of network destinations, formats a document for each of the different types of network destinations, and sends the formatted document from the multifunction device to each of the different types of network destinations. However, the Wiley device is not able to affect the destination devices' settings, as is the present invention. Other advantages of the present invention are discussed throughout this specification.

FIG. 1 shows a simplified exemplary imaging device 100 with a user interface. As shown in this figure, the user data, active data, and passive data may be entered on separate dedicated user interfaces 102a, 102b, and 102c. Alternatively, the user interface may be a single, multi-purpose user interface 102 (FIG. 4). Another alternative embodiment might include a combination of user interfaces. For example, an imaging device 100 of the present invention may include a dedicated user data user interface and a combined active data and passive data user interface. In one preferred embodiment of the multi-purpose user interface or the combination user interface, an actuation switch (e.g. facsimile server button 150 as shown in FIGS. 8, 12, 15, and 23) or setting notifies the imaging device whether the input at the combined user interface should be active data (active mode) and change the imaging device setting or converted into passive data (passive mode) for transmission to a destination. Unless otherwise specified, the all-user interface embodiments are referenced as 102.

It should be noted that the settings controlled by the passive switch may be hard-coded or configured by an administrator. It should also be noted that the "passive switch" 150 may be a specific button (e.g. facsimile server button 150 as shown in FIGS. 8, 12, 15, and 23) added to enable the passive mode. It should be noted that the terms "switch" and "button" are meant to be exemplary of any means for a user to make a selection. Alternatively, passive mode may be triggered or enabled by selection of a specific destination (e.g. when a specific destination is selected, passive mode is enabled). It should be noted that the imaging device and/or user interface may have a "passive mode" during which the user interface accepts user input as passive data. The passive mode may be enabled by the passive switch or when otherwise triggered.

Although one preferred embodiment of the present invention has a top or front panel user interface, it should be noted that the user interface may be located at a location (e.g. side) other than on the top or front of the imaging device, may be a separate dedicated device located near (e.g. on the wall or on a nearby work surface) the imaging device, or a device having components that may be used for user interface (e.g. a PDA or a cell phone). It will be understood that a front panel user interface could include a screen, buttons, a fully functional keyboard, a mouse, a touch pad, or any type of input mechanism known or yet to be discovered.

Figure 2:
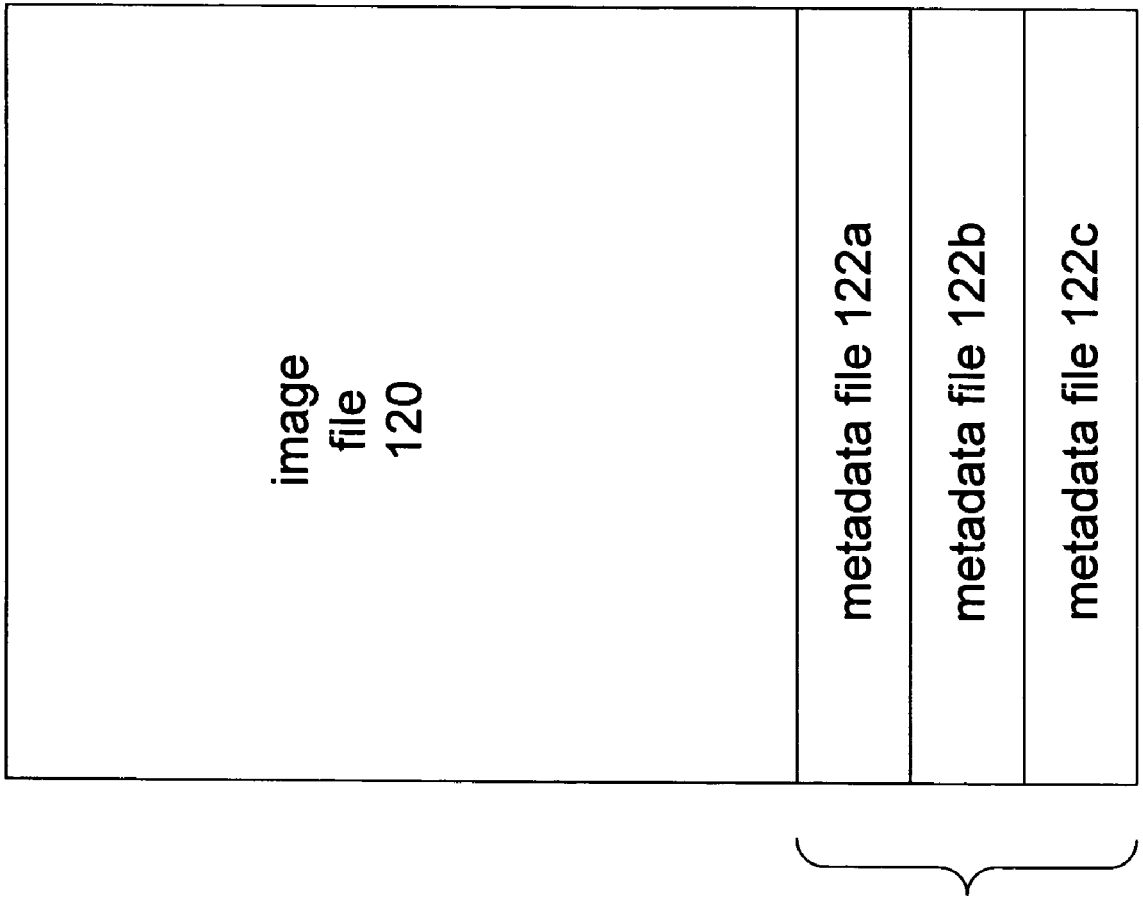
FIG. 2 is an exemplary format of an exemplary image file associated with an exemplary control file.

In one preferred embodiment, the imaging device 100 also includes a document imaging system 104 (e.g. a scanner) for capturing an image file 120, a data conversion system 106 for converting the inputted data into a passive metadata file, and a transmission system 108 for transmitting the image file 120 and an associated metadata file (which may be a control file 122) through a network 110 (e.g. intranet, extranet, LAN, WAN, or any type of system for allowing dataflow between devices). As shown in FIGS. 2 and 3, along with billing metadata 122a and other user input metadata 122b (e.g. user ID and cover sheet), the passive data metadata file 122c may be incorporated into a single control file 122. It should be noted that means may optionally be provided to format, sort, and/or categorize user data and passive data if they are combined as a single control file 122. Alternatively, the different types of metadata may be maintained in separate metadata files or categorized metadata files. It should be noted that the data conversion system 106 may be implemented in hardware, software, or a combination thereof. Further, the data conversion system 106 may be added to a standard imaging device 100 or it may be an included feature for an enhanced imaging device 100. It should be noted that the transmission system 108 may be implemented in hardware, software, or a combination thereof. Further, the user transmission system 108 may be added to a standard imaging device 100 or it may be an included feature for an enhanced imaging device 100.

As shown in FIG. 4, the imaging device 100 is connected to at least one destination through the network 110, the destination having at least one controllable setting (e.g. routing information and file formatting instructions). As will be discussed below, in one embodiment, the destination may be a destination server 114. The image file 120 and the control file 122 (including the passive data affecting at least one controllable setting of the destination from which it receives the passive metadata file) are transmitted from the imaging device 100, through the network 110, and to the destination. It should be noted that the passive metadata may affect the controllable settings of the destination immediately when the destination receives said metadata file, or the affect may be delayed until appropriate processing has taken place or until the appropriate time for the affect to take place.

One exemplary method by which the present invention may be implemented may be to have an administrator configure an imaging device 100 to implement the present invention (e.g. using embedded web pages). For example, in the facsimile server embodiment discussed below, the administrator could enable a passive switch and/or define facsimile server settings (e.g. where to deliver files) using a screen or web page such as that shown in FIG. 5. Optionally, the administrator could configure prompts for user data using a screen or web pages such as that shown in FIG. 6. Alternatively, an imaging device 100 may come pre-configured with the features of the present invention such that no configuration is necessary. It should be noted that some destinations may also need configuration such that they are able to accept passive data in the control file 122. However, in the facsimile server embodiment discussed below, a facsimile server would most likely be pre-configured to accept user data in the control file 122 and would most likely be able to accept passive data such as facsimile destinations in a similar fashion. It should be noted that specially adapted destination devices could communicate with the imaging device to coordinate device capabilities and configure the user interface. For example, if the destination device allows for encryption, communication between the destination device and the imaging device (initiated by either device) could add an encryption option to the user interface that the user could select at the imaging device and transmit as passive data in the control file.

First Exemplary Application

One example of how the present invention could be implemented is to improve the facsimile server application discussed in the Background. Users can use the advanced functions of the user interface 102, such as specialized screens and/or real-time Lightweight Directory Access Protocol (LDAP) searches, to select facsimile destinations. LDAP is a protocol for accessing on-line directory services. Although there may be a dedicated passive user interface, in this exemplary embodiment, a passive switch, button, or setting on the user interface 102 activates a passive mode in which the facsimile destination information is to be changed to a passive data file (e.g. using a data conversion system 106 for converting the passive data into a metadata file). In one preferred embodiment, there is an option for initiating prompts for user data that is compiled as a user data file. Instead of the imaging device 100 transmitting the image file 120 to the facsimile destinations (e.g. a remote facsimile machine destination or a remote email destination), imaging device 100 associates the image file 120 with a control file 122 that are transmitted together to a facsimile server 114 for processing. The facsimile server 114 parses the control file 122 and sends the image file 120 to appropriate final destinations. Appropriate portions of the control file 122 (e.g. a metadata file 122*a* that contains billing information) may be sent to alternate destinations such as a billing system 118.

Figure 7:
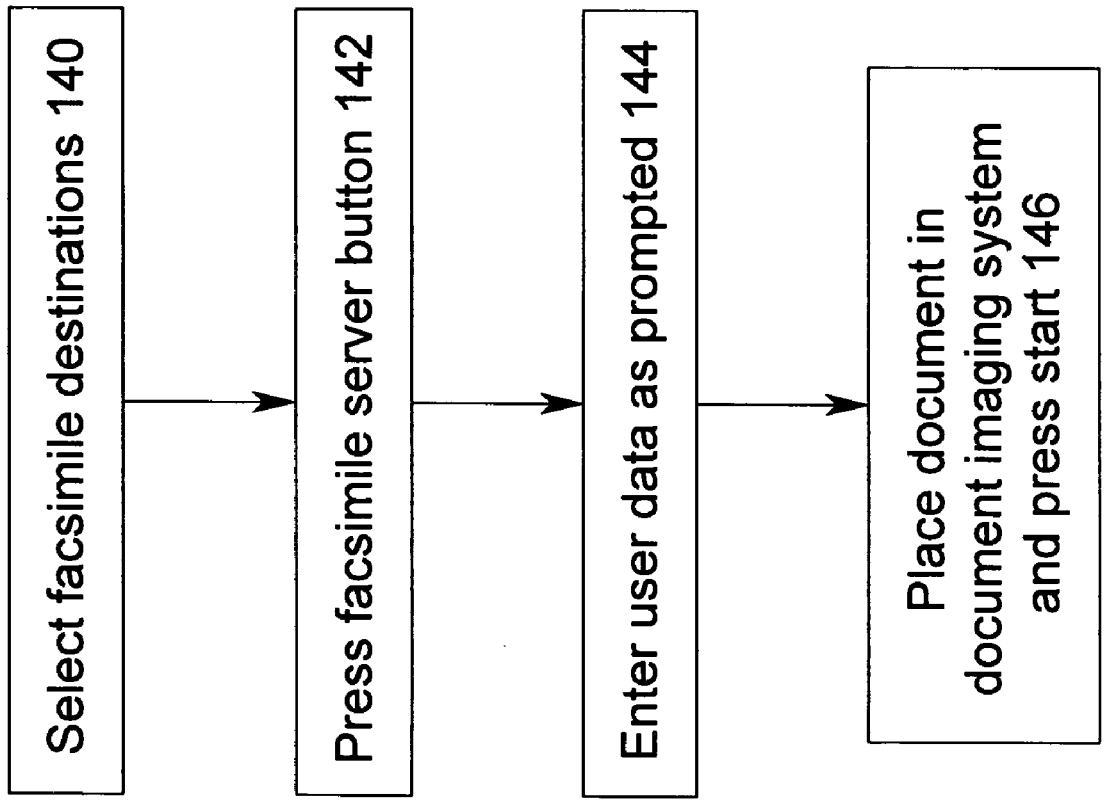
FIG. 7 is a flowchart depicting the basic steps performed by the user to implement an exemplary facsimile server embodiment of the present invention.

As shown in FIG. 7, the basic steps performed by the user to implement the exemplary facsimile server embodiment are as follows:
1. Select facsimile destinations (e.g. ad-hoc entry, one-touch keys, global search) 140;
2. Press facsimile server button (to change routing information to passive data and trigger user data prompts) 142;
3. Enter user data as prompted (e.g. user ID, billing code) 144; and
4. Place document in document imaging system 104 and press start 146.

FIGS. 8-23 show an exemplary chronology of an exemplary user interface 102 during the implementation of the exemplary facsimile server embodiment. It should be noted that the order of many of the steps is exemplary. In a shown preferred embodiment, the passive switch 150 is a "facsimile server button" on the user interface 102 of the imaging device 100. This passive switch 150 signals the device to change all routing information to passive data. In this embodiment, at least one embedded web page (e.g. that shown in FIGS. 5 and 6) may be provided that allows the administrator to enable the passive switch 150 and configure user data to be prompted for when a user selects the passive switch 150.

Figure 8:
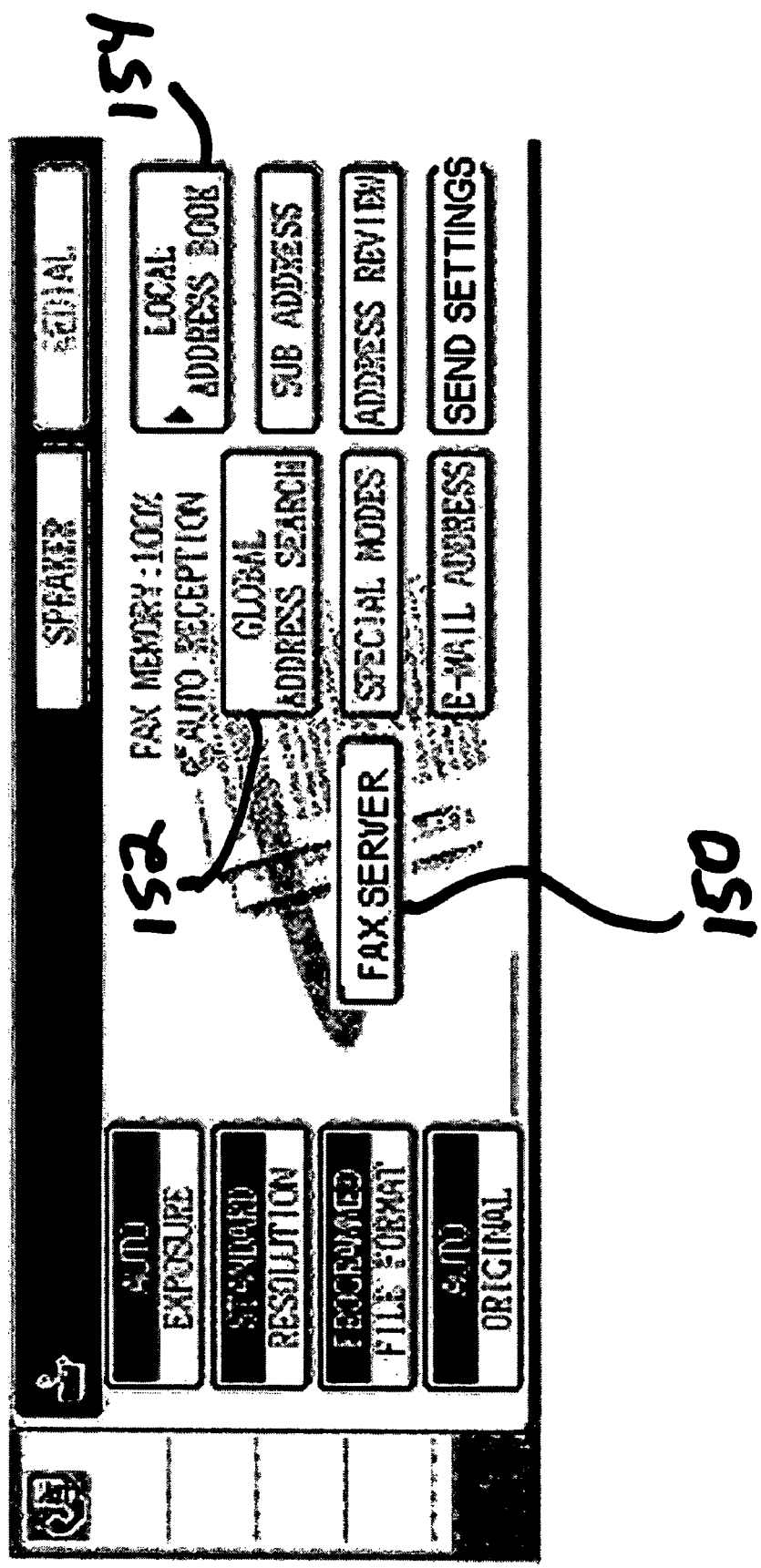
FIGS. 8-23 together show an exemplary chronology of an exemplary user interface during the implementation of the exemplary facsimile server embodiment of the present invention.
Figure 9:
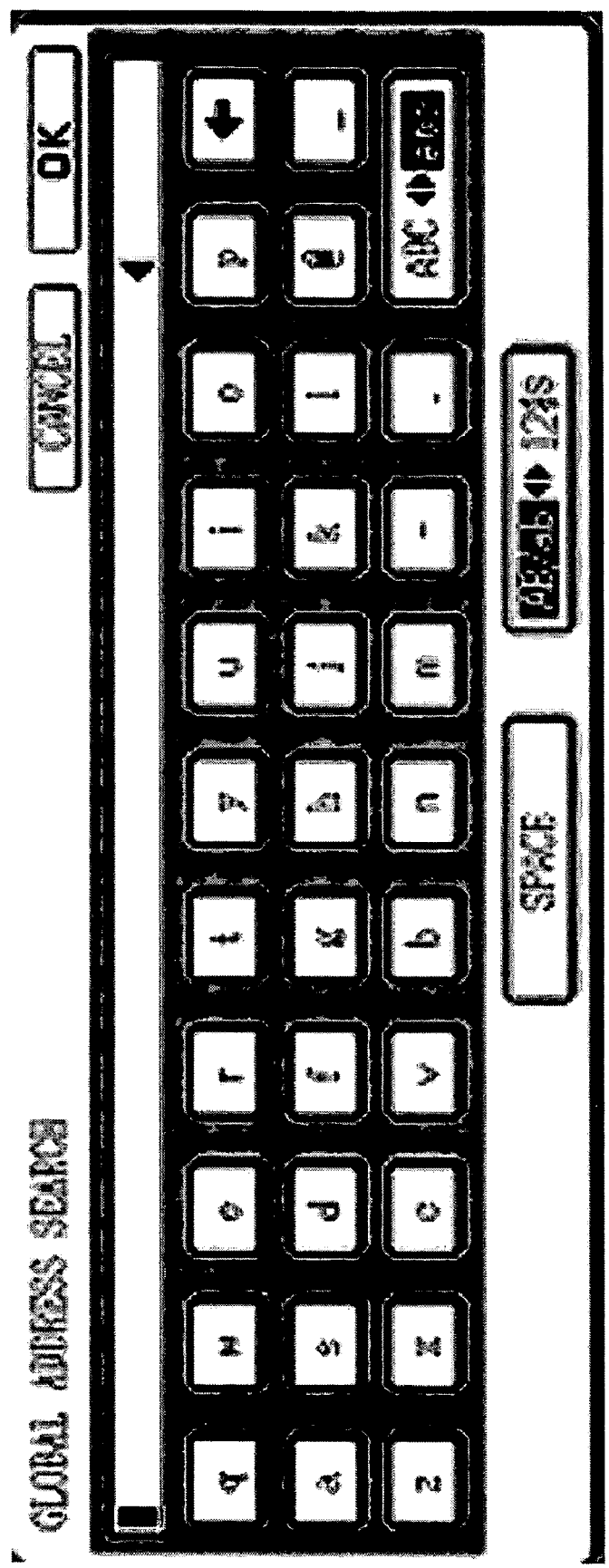
Figure 10:
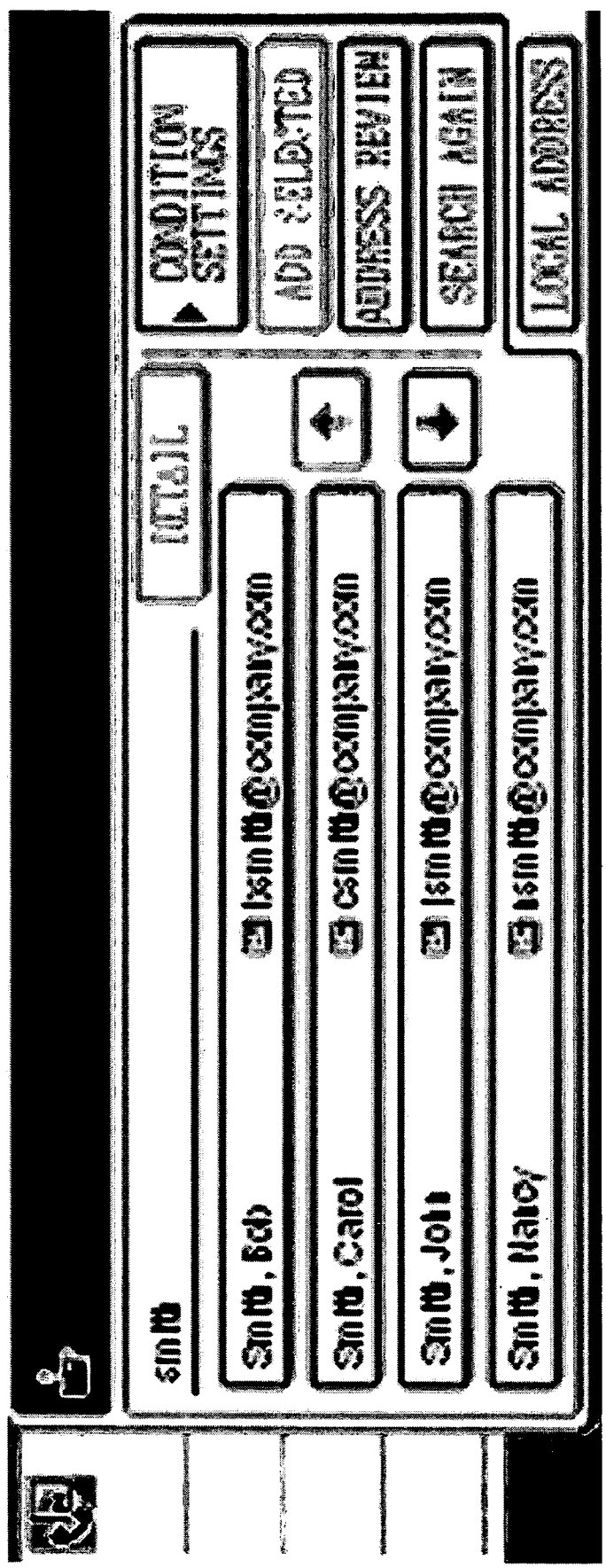
Figure 11:
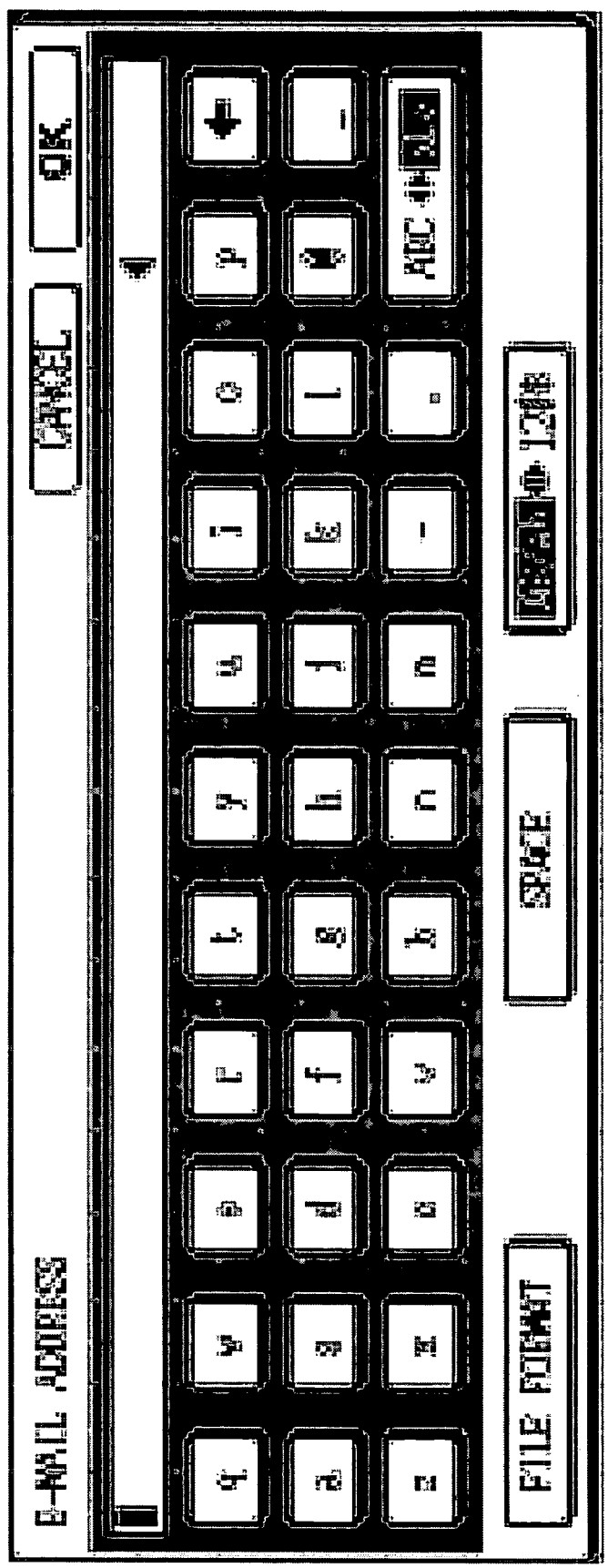
Figure 12:
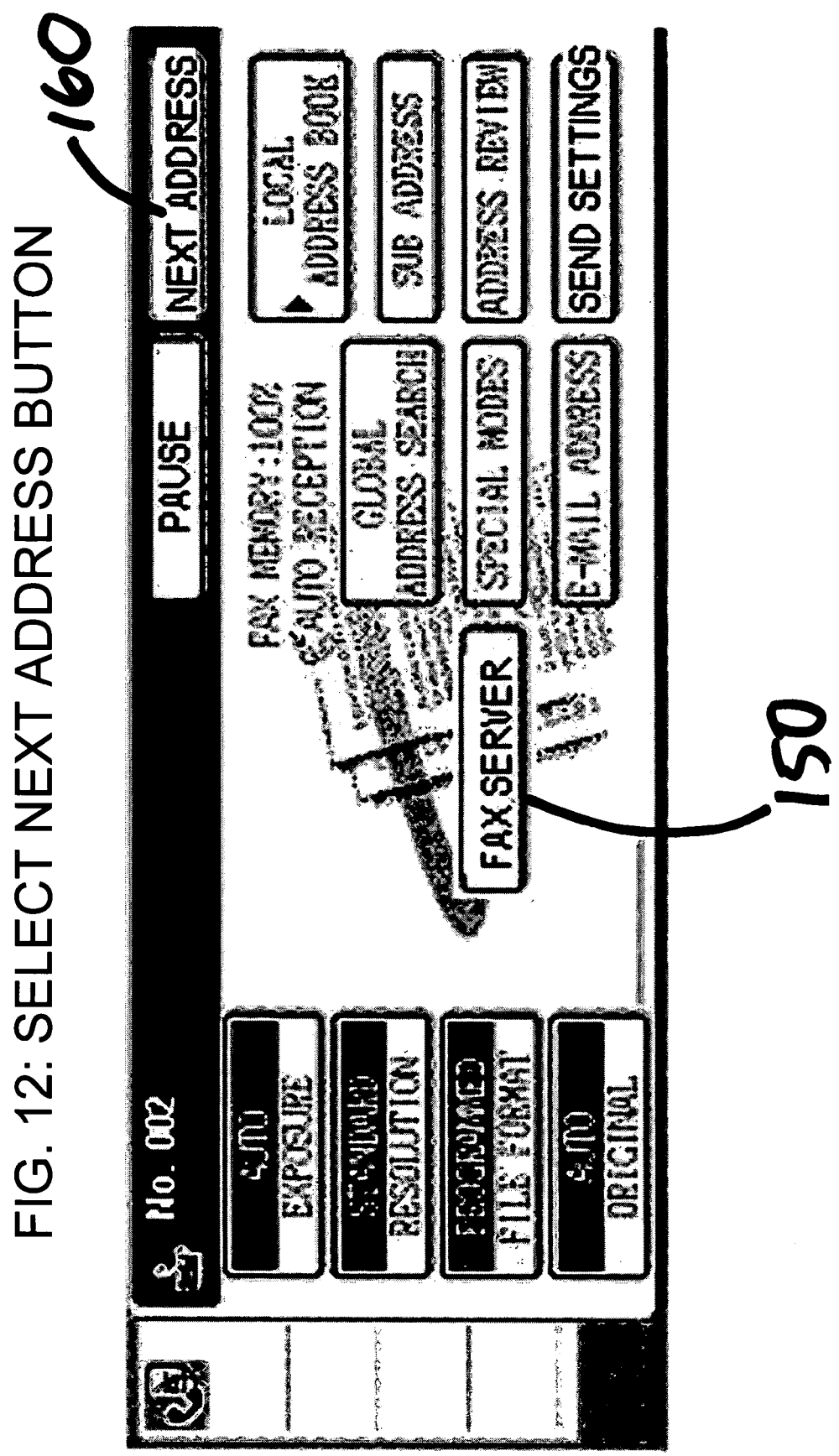
Figure 13:
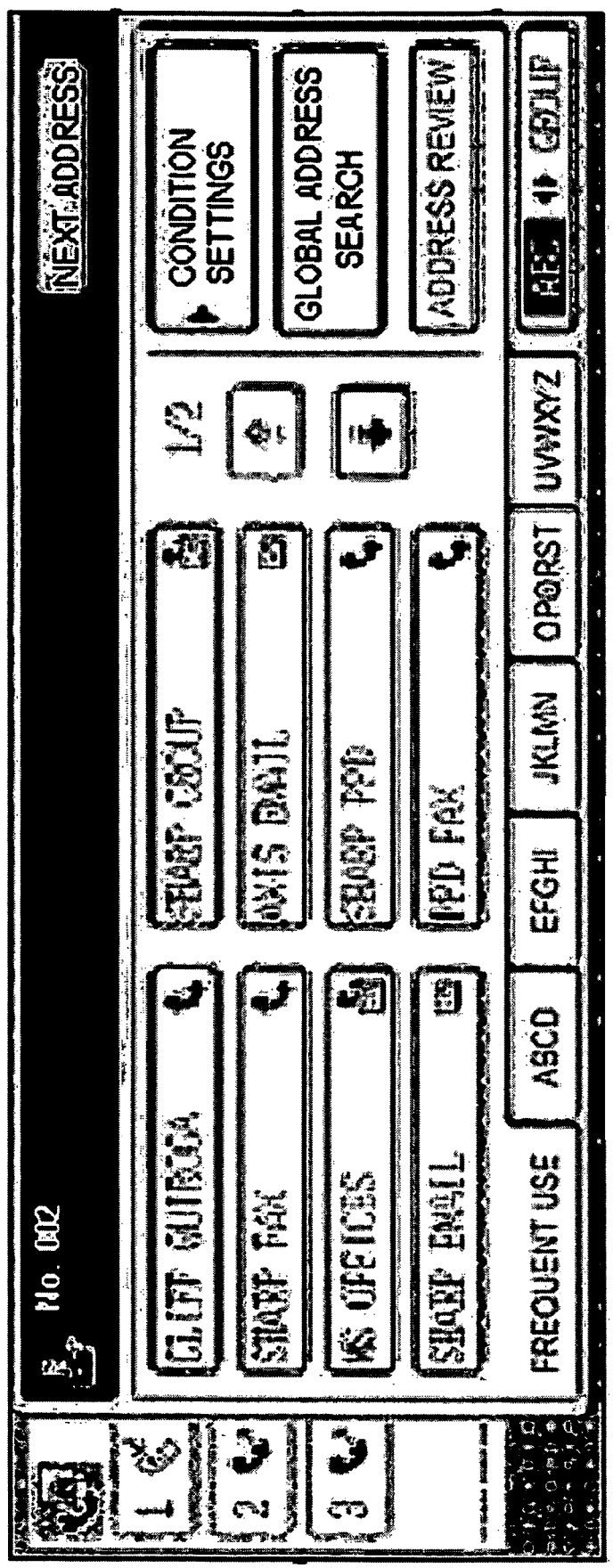
Figure 14:
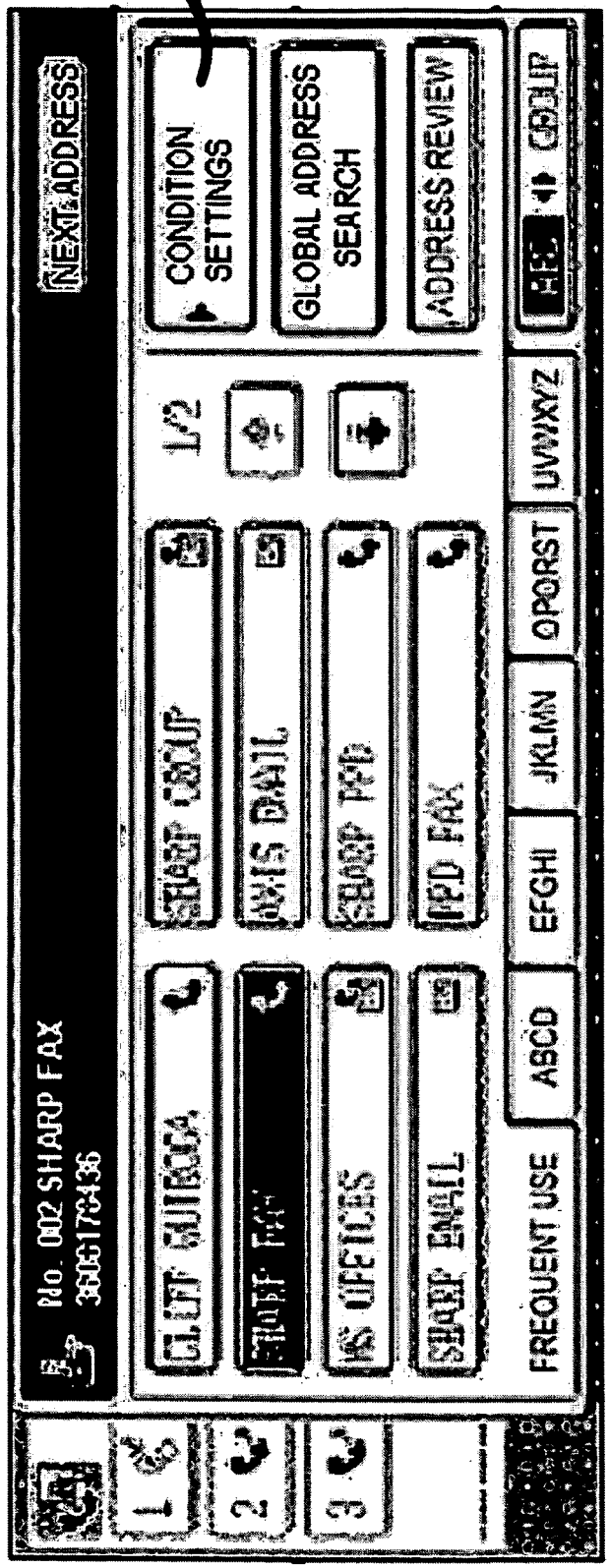
Figure 15:
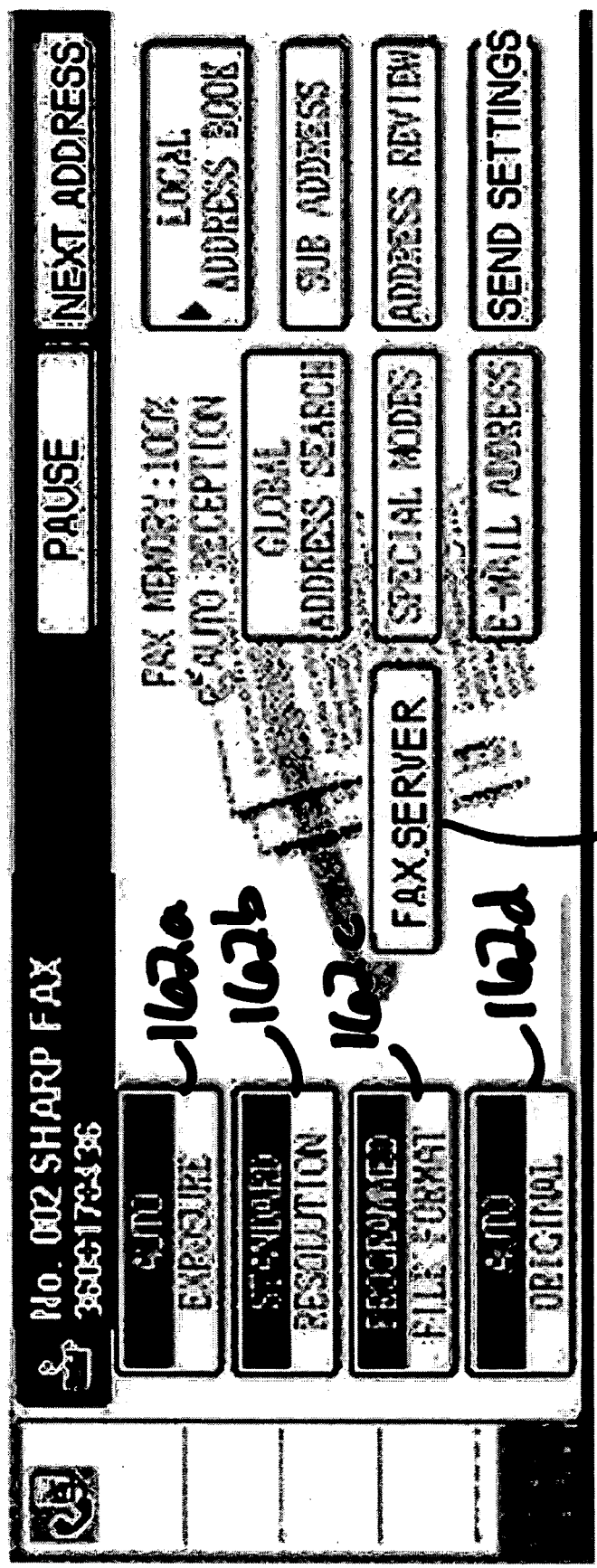
Figure 16:
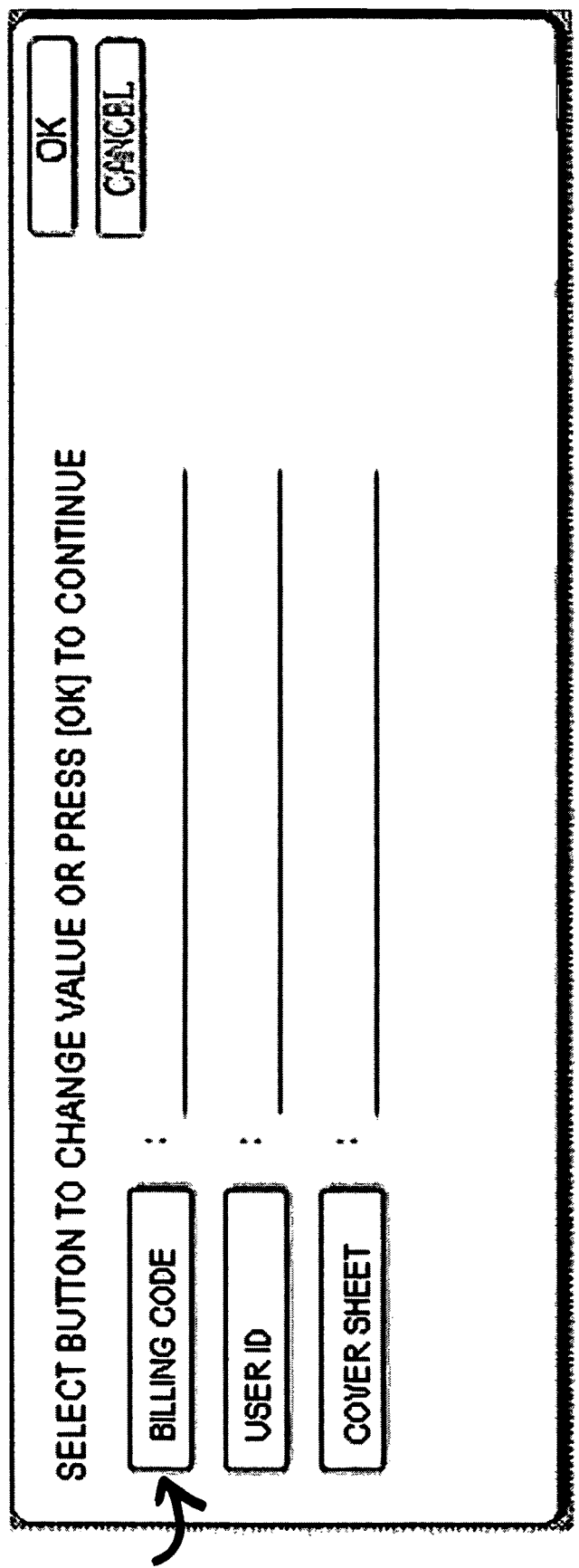
Figure 17:
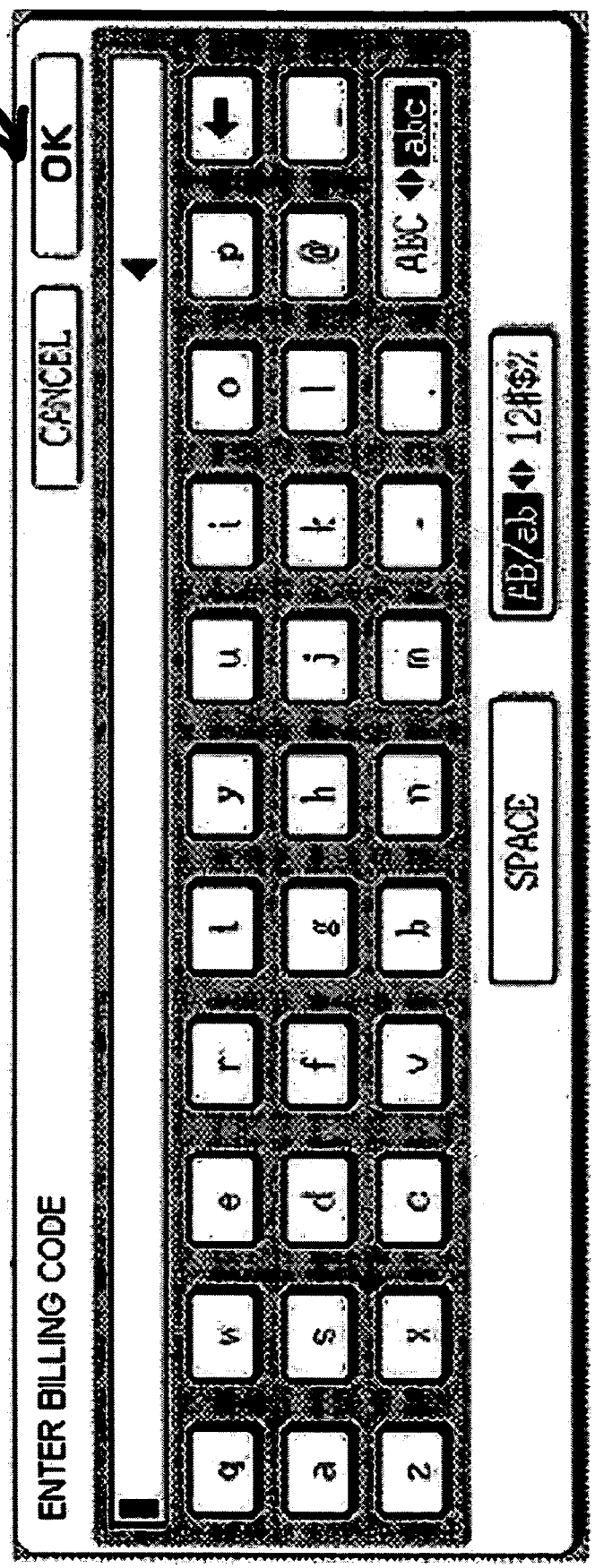
Figure 18:
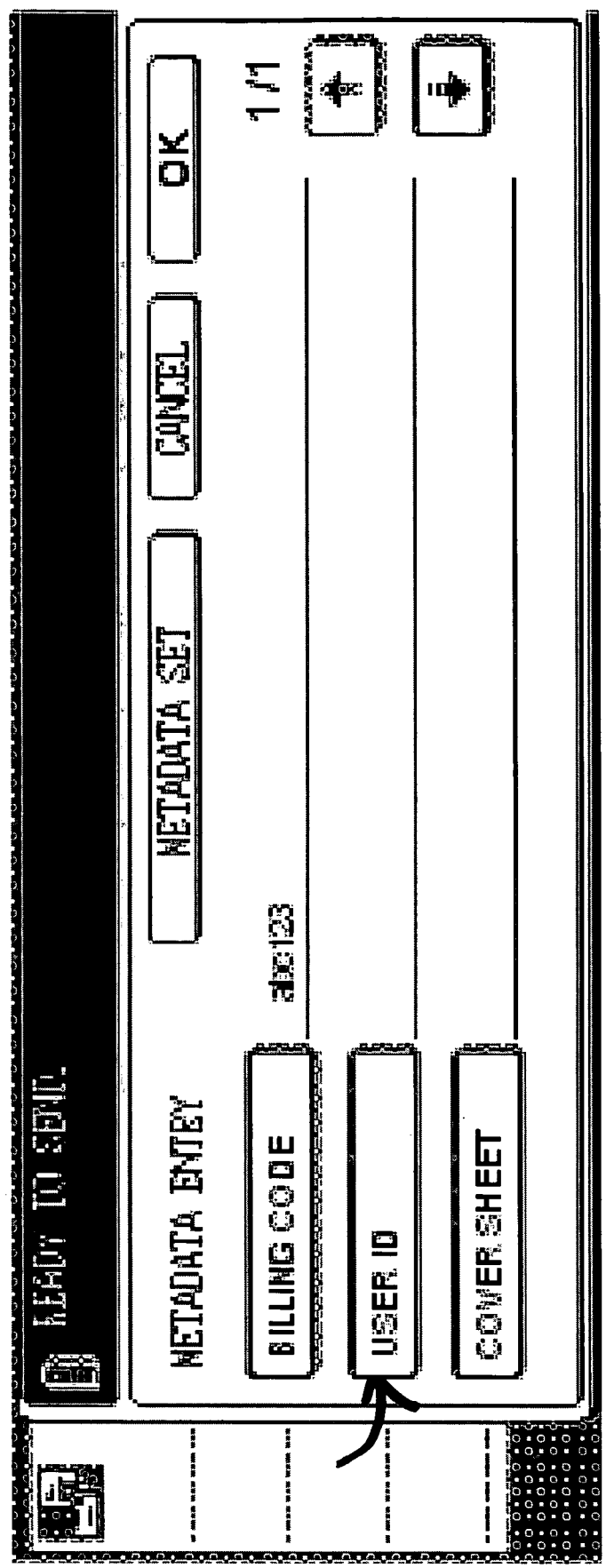
Figure 19:
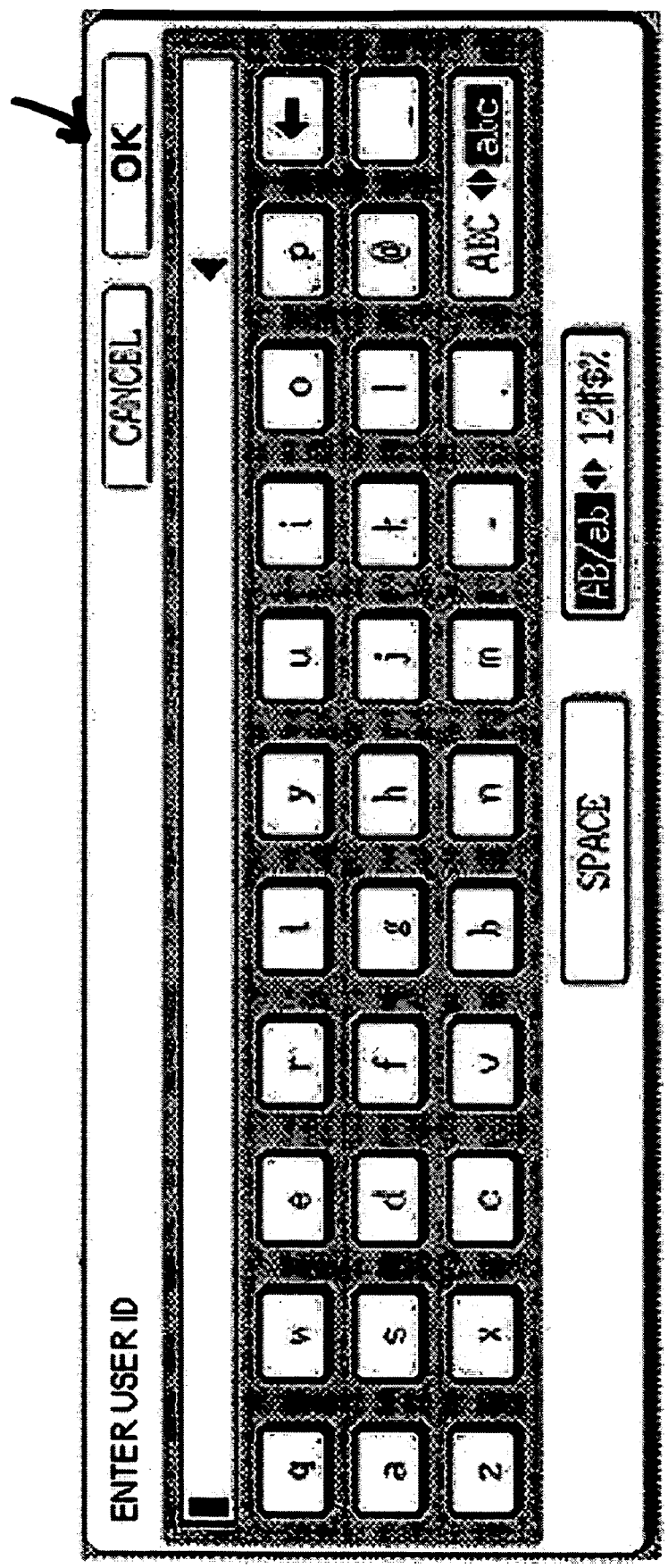
Figure 20:
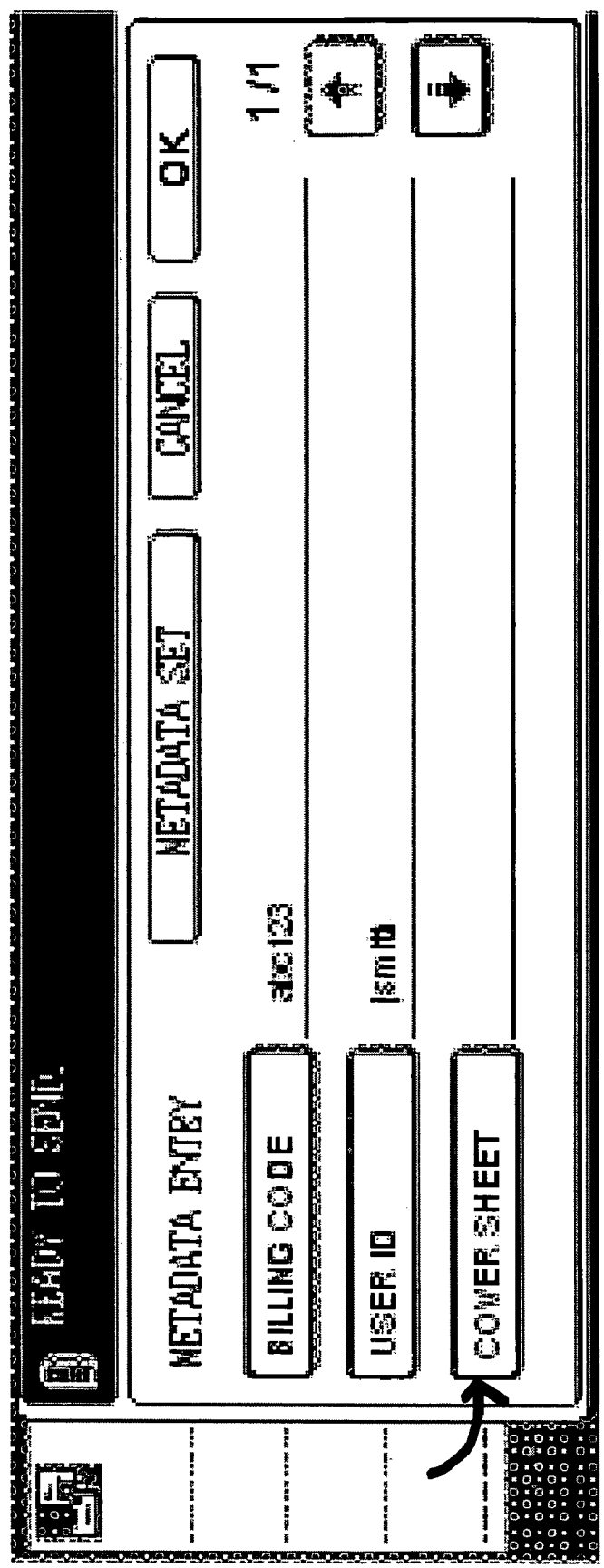

FIG. 8 shows a user interface 102 at which the user selects routing/faxing destinations. The user would have several options from this screen including, but not limited to advanced functions such as a global address search (which the user can conduct by selecting a "global address search" option 152 that would take the user to a global search screen such as that shown in FIG. 9) or a local search (which the user can conduct by selecting a "local address book" option 154 that would take the user to a local address book screen such as that shown in FIG. 13 in which the user is given the option of selecting a destination using a one-touch key). From the global search screen of FIG. 9, the user can access a network address book (and optionally a local address book that can access the specific imaging device address book for a combined search). The results of a search conducted from the global search page could be shown in a format such as the global search results screen of FIG. 10. Other alternatives could allow a user to search the internet and/or select a personal address book that is available upon user identification (e.g. by a code or access card) either on the imaging device itself or from the user's personal computer (e.g. through a network). The user may also be presented with a manual entry option (FIG. 11) in which the user is prompted to manually enter individual facsimile numbers. Between entry of destinations, the user may be prompted to select the "next address" button 160 (FIG. 12) between addresses. In one preferred embodiment, the user is able to select multiple destinations from a list without having to select the "next address" button 160 between selections. As shown in FIG. 14, for each destination selected (or for the group as a whole), the user may be given the option to select condition settings 162 (FIG. 15)

such as exposure 162*a*, resolution (162*b*), file format (162*c*), and original (162*d*). Again, these condition settings may be entered passively.

In one preferred embodiment, if it has not been done automatically, a passive switch 150 may be activated (FIG. 15) to signal the data conversion system 106 of the imaging device 100 to transform the selected information (e.g. routing information) facsimile destination to passive data. It should be noted that in alternative embodiments of the invention, the selection of certain destinations (e.g. a facsimile server configured to accept passive information) could automatically enable the present invention without a separate selection of a passive switch 150. For example, FIG. 13 shows an exemplary local address book screen in which several destination options are given to the user. The selection of one or more of these destinations could automatically enable the present invention to transform the selected information (e.g. routing information) facsimile destination to passive data.

Figure 21:
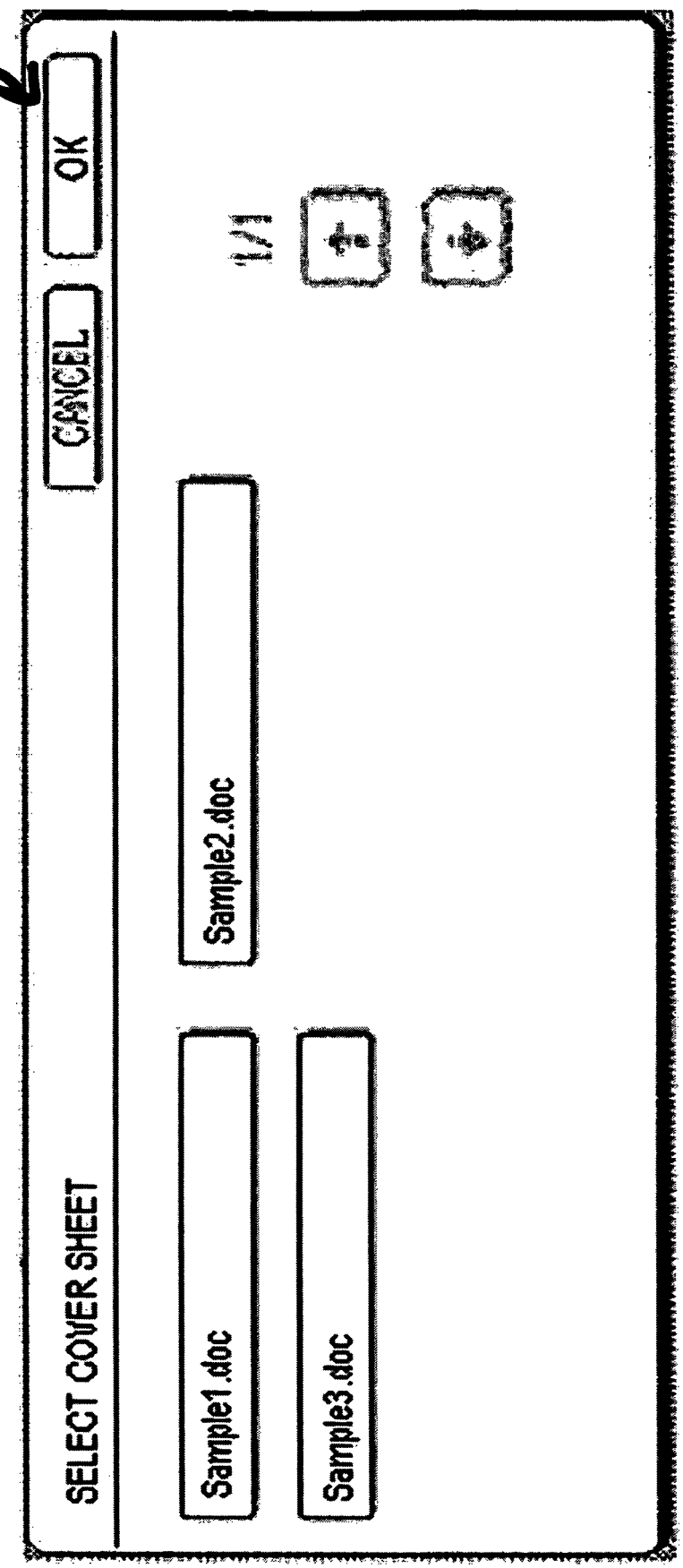
Figure 22:
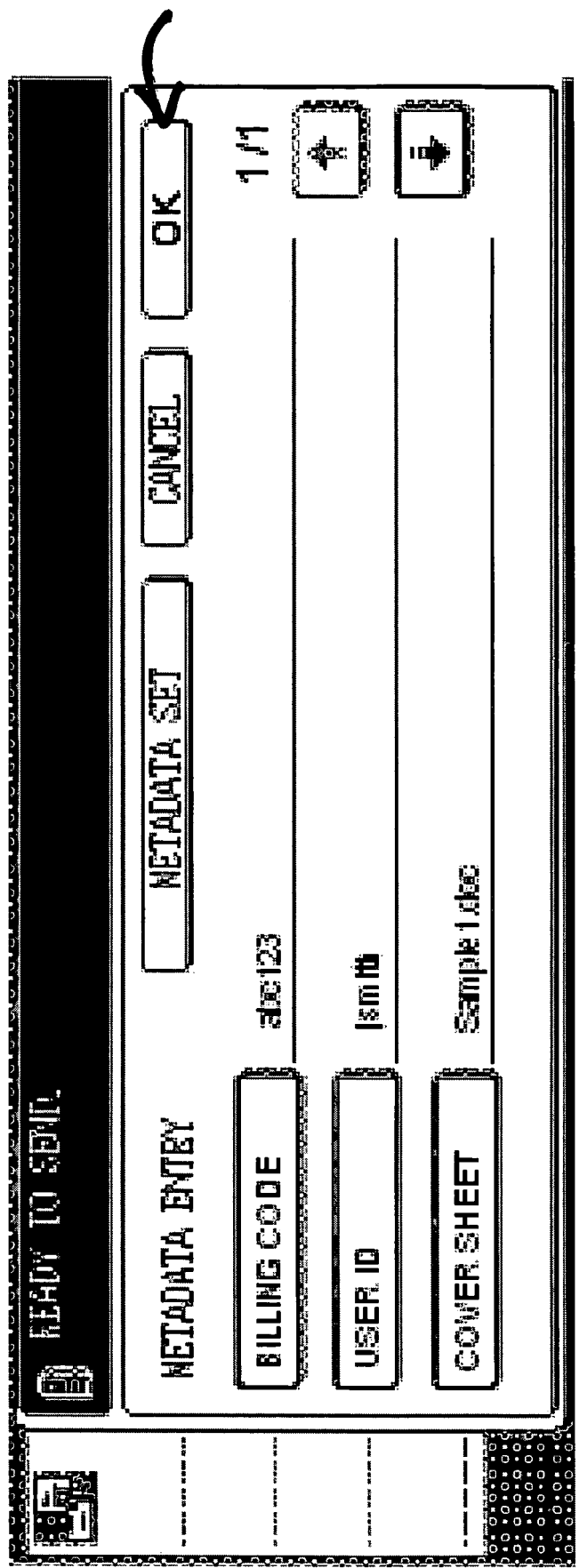
Figure 23:
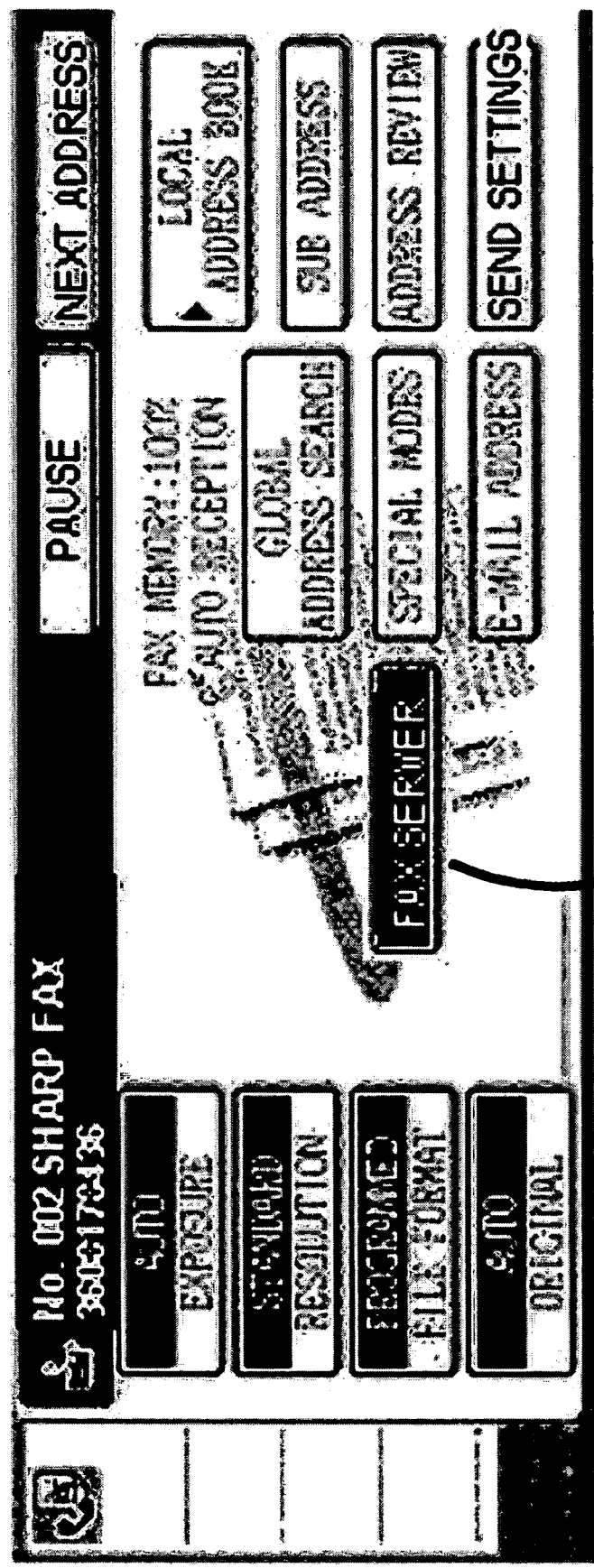

In one preferred embodiment of the invention, at this point, metadata prompts configured by administrator appear. For example, the user may be prompted to add additional routing destinations using a manual entry option (such as the one shown in FIG. 11) in which the user is prompted to manually enter individual facsimile numbers (user data). The user may also be prompted to enter data such as a user ID, a billing code, and cover sheet. The user may use a keyboard for entering this information or select from a list of predefined values (FIG. 21). FIGS. 16-22 show an exemplary chronology of an exemplary user interface 102 during the implementation of the entering of a billing code, user ID, and cover sheet.

When the user has finished making selections, he initiates the imaging of the document (using the document imaging system 104) to capture an image file 120. This may be done by placing a document in document imaging system 104 (e.g. on the glass or feeder of a scanner) and initiating the capture process. It should be noted that the image file 120 may be captured prior to the user making the selections at the user interface 102.

Using the transmission system 108, the image file 120, and an associated metadata file (e.g. a control file 122 with both the user data and passive data) are sent through a network 110 to the user specified destination (e.g. facsimile server destination 114).

The exemplary facsimile server destination 114 then processes this data and sends the scanned image to the facsimile destinations 116*a-d* specified in the control file 122. Specifically, the facsimile server destination 114 receives the control file 122 and parses the data. The facsimile server destination 114 then processes the data as necessary (e.g. add cover sheet and populate with name associated to user ID; apply charge to billing code). The facsimile server destination 114 also parses the data for destination information. Finally, the facsimile server destination 114 sends the image file 120 and the optional cover sheet to specified destinations. Optionally, the facsimile server destination 114 could send information to additional destinations (e.g. a billing system 118).

Second Exemplary Application

Figure 24:
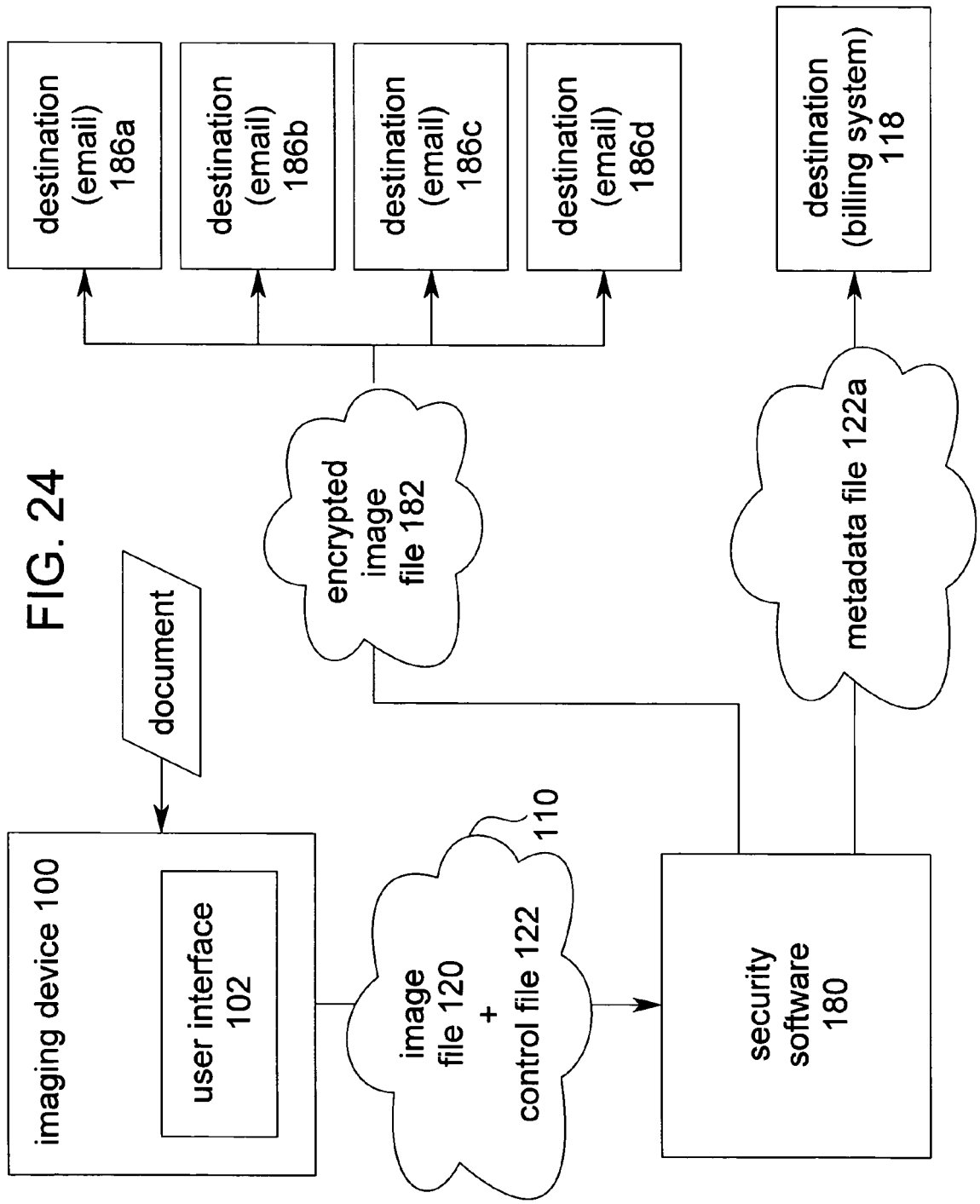
FIG. 24 is a second exemplary high-level schematic diagram for implementing the system and method of the present invention, including an imaging device connected to security software through the network.

FIG. 24 shows a second exemplary application of the present invention. In this example, the imaging device 100 includes a user interface 102 from which users can use the advanced security functions for sending, for example, email documents. The user selects user destinations in passive mode from the user interface 102 and sets document permissions via user data, active data, or passive data (entering document permissions passively would be another novel feature). The imaging device 100 then associates the image file 120 with the control file 122 (which includes the metadata settings) through a network 110 to security software 180. The security software 180 encrypts the image file 120 and applies the permissions that were defined in user data. The security software 180 (or another device or application program such as an email server) then sends the encrypted image file 182 to email destinations 186*a-d*. As with the previous example, the security software 180 (or another device or application program such as an email server) may parse the control file 122 such that appropriate portions of the control file 122 (e.g. a metadata file 122*a* that contains billing information) may be sent to alternate destinations such as a billing system 118.

Third Exemplary Application

Figure 25:
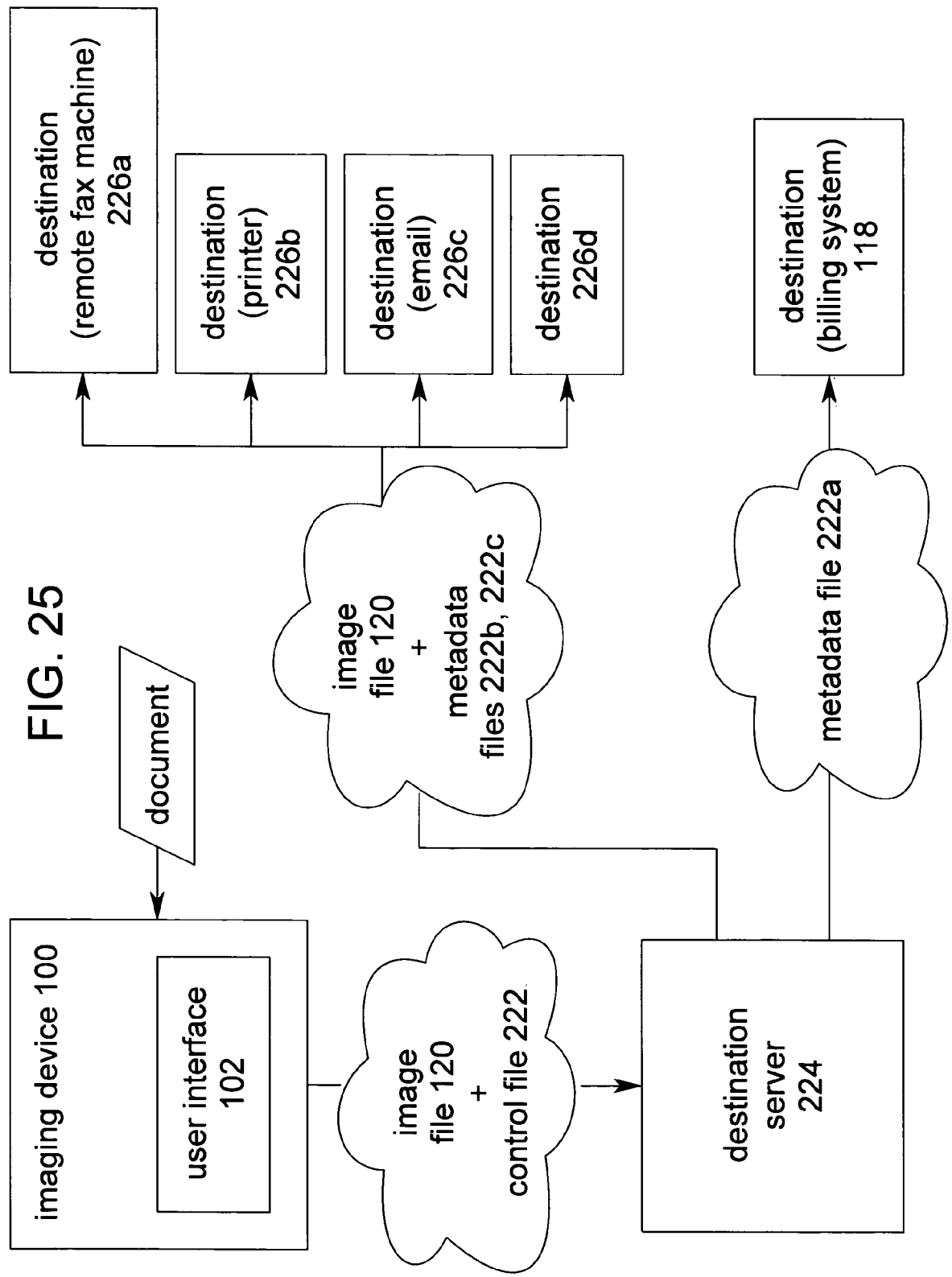
FIG. 25 is a third exemplary high-level schematic diagram for implementing the system and method of the present invention, including an imaging device connected to a destination server through the network.

FIG. 25 shows a third exemplary application of the present invention. In this example, the imaging device 100 includes a user interface 102 from which the user can select passive metadata that can change the device settings of the ultimate destination. For example, in this embodiment the user may specify/select that the ultimate document will be printed in black and white even if the ultimate device is a printer capable of printing in color. The passive metadata selected by the user is passed to the ultimate destinations to change device settings there. In the shown embodiment, the user is able to select at least some setting in passive mode from the user interface 102. The imaging device 100 then associates the image file 120 with the control file 222 (which may include billing metadata 222*a*, user input metadata 222*b*, and passive metadata 222*c*) and transmits the information through a network 110 to a destination server 224. The destination server 224 then sends the image file 120 and metadata files (e.g. metadata files 222*b* and 222*c*) to destinations 226*a-d*. As with the previous examples, the destination server 224 may parse the control file 222 such that appropriate portions of the control file 222 (e.g. a metadata file 222*a* that contains billing information) may be sent to alternate destinations such as a billing system 118.

The terms and expressions that have been employed in the foregoing specification are used as terms of description and not of limitation, and are not intended to exclude equivalents of the features shown and described or portions of them. The scope of the invention is defined and limited only by the claims that follow.

What is claimed is:

1. A system for delivering documents, said system comprising:
   a network for data transmission;
   an imaging device connected to said network, said imaging device including:
   a document imaging system for capturing an image file;
   a user interface system for accepting user input pertaining to said image file, at least one user input being passive data;
   a data conversion system for converting said passive data into a metadata file; and
   a transmission system for transmitting said image file and an associated metadata file through said network;
   at least one destination connected to said network, said destination having at least one controllable setting; and
   said passive data comprising file formatting instructions input at said user interface system of said imaging device, said passive data affecting at least one controllable setting of said destination when said destination receives said metadata file;

wherein said user interface system accepts user input as passive data upon activation of a passive switch, button, or setting on the user interface system; and wherein said at least one destination being at least one intermediate destination and an ultimate destination, and said file formatting instructions affecting at least one controllable setting of said ultimate destination when said ultimate destination receives said metadata file.

2. The system of claim 1, wherein said imaging device is an MFP.

3. The system of claim 1, said passive data further comprising routing information input at said user interface system of said imaging device.

4. The system of claim 1, said passive data further comprising user information input at said user interface system of said imaging device.

5. The system of claim 1 wherein said file formatting instructions are selected from the group consisting of:
   (a) data format;
   (b) compression ratio;
   (c) color options;
   (d) exposure;
   (f) resolution;
   (g) encryption;
   (h) security settings; and
   (i) permissions.

6. The system of claim 1, said passive data further comprising billing information input at said user interface system of said imaging device.

7. The system of claim 1, wherein said user interface system accepts user input as passive data upon selection of a specific destination.

8. A method for delivering documents from an imaging device to at least one destination, said method comprising the steps of:
   capturing an image file using a document imaging system associated with said imaging device;
   accepting user input as passive data using an imaging device user interface system of said imaging device, said passive data comprising file formatting instructions accepted at said imaging device user interface system;
   converting said passive data into a metadata file;
   transmitting said image file and an associated metadata file through a data transmission network to said at least one destination having at least one controllable setting;
   affecting at least one controllable setting of said at least one destination according to said passive data in said metadata file; and
   activating a passive mode by activating a passive switch, button, or setting on the user interface system; wherein said at least one destination being at least one intermediate destination and an ultimate destination, and said step of affecting at least one controllable setting of said at least one destination according to said passive data in said metadata file further comprising affecting at least one controllable setting of said ultimate destination according to said file formatting instructions in said metadata file.

9. The method of claim 8, further comprising the step of activating a passive mode by selecting a specific destination.

10. The method of claim 8, said passive data further comprising billing information input at said imaging device user interface means.

11. The method of claim 8 wherein said file formatting instructions are selected from the group consisting of:
   (a) data format;
   (b) compression ratio;
   (c) color options;
   (d) exposure;
   (f) resolution;
   (g) encryption;
   (h) security settings; and
   (i) permissions.

12. The method of claim 8, further comprising the steps of:
   transmitting said image file and an associated metadata file through a data transmission network to said ultimate destination having at least one controllable setting; and
   affecting at least one controllable setting of said ultimate destination according to said passive data in said metadata file.

13. A system for delivering documents from an imaging device to at least one destination, said system comprising:
   means for capturing an image file, said means for capturing an image file being part of said imaging device;
   imaging device user interface means for accepting user input as passive data, said imaging device user interface means being part of said imaging device, said passive data comprising file formatting instructions accepted at said imaging device user interface means;
   means for converting said passive data into a metadata file;
   means for associating said image file to at least one said metadata file;
   means for transmitting said image file and at least one associated metadata file through a data transmission network to said at least one destination having at least one controllable setting;
   said at least one controllable setting of said at least one destination being affected according to said passive data in said metadata file;
   means for transmitting said image file and an associated metadata file through a data transmission network to an ultimate destination having at least one controllable setting; and
   said at least one controllable setting of said ultimate destination being affected according to said passive data in said metadata file; wherein said at least one destination being at least one intermediate destination and an ultimate destination, and said at least one controllable setting of said ultimate destination being affected according to said file formatting instructions in said metadata file.

14. The system of claim 13, further comprising means for activating a passive mode during which said user interface means accepts user input as passive data.

15. The system of claim 13, said passive data further comprising billing information input at said imaging device user interface means.

16. The system of claim 13 wherein said file formatting instructions are selected from the group consisting of:
   (a) data format;
   (b) compression ratio;
   (c) color options;
   (d) exposure;
   (f) resolution;
   (g) encryption;
   (h) security settings; and
   (i) permissions.

17. A system for delivering documents, said system comprising:
   a network for data transmission;
   an imaging device connected to said network, said imaging device including:

a document imaging system for capturing an image file;

a user interface system for accepting user input pertaining to said image file, at least one user input being passive data;

a data conversion system for converting said passive data into a metadata file; and a transmission system for transmitting said image file and an associated metadata file through said network;

at least one destination connected to said network, said destination having at least one controllable setting, said at least one destination being a destination server and an ultimate destination;

said passive data comprising file formatting instructions input at said user interface system of said imaging device, said passive data affecting at least one controllable setting of said destination when said destination receives said metadata file;

said ultimate destination having at least one controllable setting; and said passive metadata being passed to said ultimate destination to change device settings therein.

18. A system for delivering documents, said system comprising:

a network for data transmission;

an imaging device connected to said network, said imaging device including:

a document imaging system for capturing an image file;

a user interface system for accepting user input pertaining to said image file, at least one user input being passive data;

a data conversion system for converting said passive data into a metadata file; and a transmission system for transmitting said image file and an associated metadata file through said network;

at least one destination connected to said network, said destination having at least one controllable setting, said at least one destination being at least one intermediate destination and at least one ultimate destination; and said passive data comprising routing information instructions input at said user interface system of said imaging device, said passive data affecting at least one controllable setting of said destination when said destination receives said metadata file, said routing information in said metadata file for directing said intermediate destination to transmit said image file to at least one ultimate destination specified by said routing information.

19. The system of claim 18, said passive data further comprising file formatting instructions, and said file formatting instructions affecting at least one controllable setting of said ultimate destination when said ultimate destination receives said at least part of the metadata file.

20. The system of claim 18, said passive data further comprising billing information, said routing information in said metadata file further for directing said intermediate destination to transmit said billing information to at least one ultimate destination.

* * * * *